United States Patent
Janin et al.

(10) Patent No.: US 7,215,378 B2
(45) Date of Patent: May 8, 2007

(54) METHOD FOR CENTERING AND DIMENSIONING AN IMAGE ON A CATHODE-RAY TUBE

(75) Inventors: Pascal Janin, Tullins (FR); Laurent Vera, Edinburgh (GB); Hervé Pierrot, Saint Egreve (FR)

(73) Assignee: STMicroelectronics SA, Montrouge (FR)

( * ) Notice: Subject to any disclaimer, the term of this patent is extended or adjusted under 35 U.S.C. 154(b) by 679 days.

(21) Appl. No.: 10/344,546

(22) PCT Filed: Sep. 7, 2001

(86) PCT No.: PCT/FR01/02790

§ 371 (c)(1),
(2), (4) Date: Feb. 11, 2003

(87) PCT Pub. No.: WO02/21491

PCT Pub. Date: Mar. 14, 2002

(65) Prior Publication Data

US 2004/0012716 A1    Jan. 22, 2004

(30) Foreign Application Priority Data

Sep. 8, 2000    (FR) ................................... 00 11482

(51) Int. Cl.
*H04N 9/74* (2006.01)
(52) U.S. Cl. .................... 348/511; 348/581; 348/704
(58) Field of Classification Search ............... 348/511, 348/745, 747, 580–581, 704, 806–807, 184–191, 348/181; 315/370–371; *H04N 5/04, 3/22, H04N 9/14*
See application file for complete search history.

(56) References Cited

U.S. PATENT DOCUMENTS

| 5,654,743 | A | * | 8/1997 | Hu et al. | 345/213 |
| 5,713,040 | A | * | 1/1998 | Lee | 345/214 |
| 5,764,302 | A |   | 6/1998 | Park | 348/542 |
| 5,801,767 | A | * | 9/1998 | Wu | 348/190 |
| 6,259,483 | B1 | * | 7/2001 | Jiang et al. | 348/511 |
| 6,259,484 | B1 | * | 7/2001 | Jiang et al. | 348/511 |
| 6,262,765 | B1 | * | 7/2001 | Jeong | 348/180 |

FOREIGN PATENT DOCUMENTS

DE    19724409    12/1998
DE    19822311     4/1999

* cited by examiner

*Primary Examiner*—Trang U. Tran
(74) *Attorney, Agent, or Firm*—Lisa K. Jorgenson; Allen, Dyer, Doppelt, Milbrath & Gilchrist, P.A.

(57) ABSTRACT

A method for centering and dimensioning an image on a cathode ray tube receiving display signals supplied by a display calculator includes measuring durations of vertical black edges of the image, and modifying adjustment values for a horizontal centering of the image to obtain equal lateral vertical edges. The method further includes measuring the durations of the vertical black edges of the image to calculate adjustment values for a horizontal dimension of the image to cause the vertical black edges to disappear. Durations of the horizontal black edges of the image are measured to calculate adjustment values of a vertical dimension of the image, and to calculate adjustment values of a vertical centering of the image to cause the horizontal black edges to disappear for centering the image vertically. The adjustment values obtained are recorded in a memory of the display calculator.

26 Claims, 5 Drawing Sheets

METHOD FOR CENTERING AND DIMENSIONING AN IMAGE ON A CATHODE-RAY TUBE

The present invention relates to cathode ray tubes used for displaying images on television (TV) sets and personal computers (PC). More particularly, it relates to a method of automatically centering and dimensioning a displayed image.

A cathode ray tube for displaying images on a screen formed by its faceplate generally comprises electronic circuits which control the scanning of the screen by an electron beam so as to activate or not the luminescence of screen pixels and thus produce the desired image.

These electronic scanning circuits are driven via a display controller through electrical signals which can have different sources, such as computer signals, signals from laser disks or game consoles. Because of their diversity, a same setting for the size and position of the image cannot be suitable for all sources and can result in a bad centering of the image on screen and a distorted image. These defects can moreover exist for a cathode ray tube from the factory in the case where the settings are not properly adjusted.

This can account for the presence of black stripes on the vertical or horizontal edges of the image, a horizontal or vertical shift of the image, or an image distortion in the horizontal or vertical direction.

In the state of the art, these faults are corrected manually by the user through control buttons which bring up adjustment menus and sub-menus. Such an operating procedure is neither fast nor simple, notably owing to the fact that there are only few control buttons, which requires the user to employ a same button for several different functions.

This is all the more inconvenient as these adjustments must be made as a function of the screen's operating mode, for example to pass from one video mode to another or from a classical 640×480 pixel screen to a higher definition 1280×1024 pixel screen.

Accordingly, when changing from one video mode to another, the display calculator analyzes the new horizontal and vertical synchronization signals, calculates their frequencies and carries out the necessary adjustments to display a new image in the new mode. However, the image obtained is never perfectly adapted to the screen size, and consequently suffers from faults as regards centering and dimensioning or size mentioned above.

Therefore, in the state of the art, the user must activate the control buttons provided for that purpose until the desired image is obtained, and the adjustments made are written into a memory of the display calculator, not only for the current session, but also for later sessions with the same display mode.

However, despite this memory storage of the settings, the user often needs to readjust the latter during a subsequent use of the same display mode, and all the more so as the settings of the mode entered in memory are not always adapted to all software which use that mode.

An object of the present invention is thus to implement a process for automatically centering and dimensioning an image on the screen of a cathode ray tube.

The invention relates to a method of centering and dimensioning an image on a cathode ray tube whose display signals are supplied by a display calculator, the method being characterized in that it comprises the following steps:

(a) measuring the durations of the vertical black edges of the image and modifying step by step the adjustment (HPOS) for horizontal centering to obtain equal lateral vertical edges;

(b) measuring the durations of the vertical black edges of the image to calculate the adjustment (HSIZE) of the horizontal dimension of the image so as to cause the vertical black edges to disappear;

(c) measuring the durations of the horizontal black edges of the image to calculate the adjustment of the vertical dimension of the image (VSIZE') and the adjustment of the vertical centering of the image (VPOS') so as to cause the horizontal black edges to disappear and to center the image vertically, and (d) recording the adjustment values obtained (HPOS, HSIZE, VSIZE' and VPOS') in a memory of the display calculator.

Steps (a), (b) and (c) can be performed in any order because they are independent of each other, but it is advisable to perform step (a) before step (b), given that the precision for the calculation of the setting (HSIZE) for the horizontal dimension of the image depends on the perfect horizontal centering of the image.

Step (d) can come into play after each step (a), (b) or (c) to record the value of the setting obtained by the step having just been finished.

The method is implemented only if the image is sufficiently stable, this being detected by checking that the positions of the vertical and horizontal edges have fluctuations below a certain threshold. This stability is checked before each step (a), (b) or (c)

Other characteristics and advantages of the present invention shall become apparent from reading the following description of a preferred embodiment, in relation with appended drawings in which:

FIG. 1-A shows an image on a screen of a cathode ray tube which is not centered and exhibits a black surround, and FIG. 1-B shows the same image after implementation of the process in accordance with the invention;

FIG. 2 is a diagram showing the relations between the horizontal position of the image on screen and the horizontal scanning signal for an image line;

FIG. 3 is a diagram analogous to that of FIG. 2, but showing the relations between the vertical position of the image on screen and the vertical scanning signal for a complete image;

FIG. 4 is a diagram showing the main steps of the process in accordance with the invention;

FIGS. 5-A and 5-B show the steps in the horizontal image centering algorithm in accordance with the process of the invention, this algorithm being preceded by an algorithm for checking the image stability;

FIG. 6 is a curve showing the variation of $H_{AMPMIN}$ as a function of the horizontal scanning frequency for a given range of frequencies; and FIG. 7 is a diagram showing the adjustment for vertical centering and vertical dimensioning.

FIG. 1-A shows the faceplate 10 of cathode ray tube 12, on the screen of which appears an image 14 whose vertical edges 16 and horizontal edges 18 are black (i.e. dark), so indicating that the image 14 is not centered at the center of the screen and that it only occupies a part of the screen.

As indicated in the introductory portion above, the adjustments for centering and dimensioning the image are at present made by the user through buttons 20 which bring down menus and sub-menus on the screen to guide the user in the adjustments.

These control buttons 20 are active for the adjustments via a display calculator which supplies the values of horizontal and vertical scanning signals. This display calculator is capable of receiving the video signals and analyzing them to output these scanning signals.

In accordance with the invention, a control button 22 (FIG. 1-B) is added to implement the inventive process and obtain in a few seconds the correctly centered and dimensioned image of FIG. 1-B.

The process of the invention is based on the measurement of the length, in units of time, of vertical and horizontal black edges, these measurements then serving for carrying out algorithmic operations and calculations leading to a modification of the image centering and its dimensions.

FIG. 2 shows the image 14 and the corresponding horizontal scanning signal 30 as a function of time t for a line of the image, i.e. the current $I_H$ flowing in the horizontal deflection coil (yoke). The figure also shows the horizontal synchronization pulses 32 and 34 (HFBACK) which determine the start and end points of a horizontal scanning signal, the start of horizontal scanning corresponding to the falling edge of pulse 32 and the end corresponding to the rising edge of pulse 34. The duration of the scanning return (flyback) is given by the duration of pulse 32 or 34.

When the image exhibits vertical black edge portions, this comes from the fact that signals of the Red, Green and Blue components at the start and end of horizontal scanning are all below a certain level. The measure of the time duration $T1_{HAV}$ between the falling edge and the start of the left of the image indicates the extent of the left vertical black edge portion while a measure of $T2_{HAV}$ between the end of the right of the image and the rising edge indicates the extent of the right vertical black edge portion.

It then follows that if $T1_{HAV}=T2_{HAV}$, then the image is centered horizontally, whereas it is not centered if $T1_{HAV}$ is different from $T2_{HAV}$.

The process in accordance with the invention obtains horizontal centering of the image by:
  measuring $T1_{HAV}$ and $T2_{HAV}$ in a repetitive manner,
  comparing $T1_{HAV}$ and $T2_{HAV}$ at each time,
  displacing the image by one unit towards:
    the right if $T1_{HAV}<T2_{HAV}$,
    the left if $T1_{HAV}>T2_{HAV}$ until is obtained the equality $T1_{HAV}=T2_{HAV}$.

The measurement of $T1_{HAV}$ and $T2_{HAV}$ is performed by the display calculator using a device provided to that effect and known per se.

$Tl_{HAV}$ and $T2_{HAV}$ do not allow to obtain the horizontal dimensioning of the image for making the vertical black edge portions disappear, since the time interval between two horizontal synchronization pulses 32 and 34 is fixed, irrespective of the horizontal width of the image. The process of the invention produces this horizontal dimensioning by modifying the amplitude of the curve 30 in accordance a formula, as shall be described below.

FIG. 3 shows the image 14 and the corresponding vertical scanning signal 40 as a function of time t for a complete image, i.e. the voltage $V_v$ of the vertical deflection sawtooth signal for line-by-line vertical screen scanning. The figure also shows the vertical synchronization signals 42 and 44 (VFBACK) which determine the start and end points of a vertical scanning signal, the duration of the pulse determining the duration of the return period for the vertical scanning signal.

As in the case of horizontal line scanning, the time periods $T1_{VAV}$ and $T2_{VAV}$ respectively define the extents of the top black edge portion and the bottom black edge portion of the image. However, these time periods cannot serve to center the image vertically because the time interval between the top and bottom edges of the image and the corresponding pulses 42 and 44 remain constant irrespective of the vertical position of the image.

Likewise, the time periods $T1_{VAV}$ and $T2_{VAV}$ cannot serve directly for vertically dimensioning the image because the time period of the vertical synchronisation pulses 42, 44 remains the same irrespective of the image height. The measurement of $T1_{VAV}$ and $T2_{VAV}$ is carried out by the display calculator using the above-mentioned measuring device for measuring $T1_{HAV}$ and $T2_{HAV}$.

The process according to the invention provides the vertical centering and the vertical dimensioning by modifying the amplitude of the curve 40 in accordance with a formula as shall be described hereafter.

The diagram of FIG. 4 illustrates the main steps of the invention, which comprises the steps of:
  (a) measuring $T1_{HAV}$ and $T2_{HAV}$ to calculate the adjustment HPOS to perform in order to obtain the horizontal centering of the image (box 50),
  (b) measuring $T1_{HAV}$ and $T2_{HAV}$ to calculate the adjustment to perform HSIZE in order to obtain the horizontal dimensioning of the image (box 52),
  (c) measuring $T1_{VAV}$ and $T2_{VAV}$ to calculate the adjustment to perform VPOS and VSIZE in order to obtain at the same time vertical centering and the vertical dimensioning of the image (box 54), and
  (d) recording the values HPOS, HSIZE, VPOS' and VSIZE' in a memory (box 56) of the display calculator.

If an error arises during one or another of steps 50, 52 and 54, notably in the case of image instability, the starting values are restored in the memory (box 58). These errors can arise from an image which is unstable, which is shifting, which is too small to be adjusted, or for any other reason.

Note that steps (a), (b) and (c) can be performed in any order, but it appears logical to start with the simplest, which is the horizontal centring step, owing to the fact that it stems directly from the measurement of $T1_{HAV}$ and $T2_{HAV}$. Moreover, step (b) yields more precise results if it follows from step (a).

The diagram of FIGS. 5-A and 5-B shows in detail the operations to be performed during step (a) for horizontal centring. However, the first operations 60, 62, 64, 66, 68 and 70 are repeated, wholly or in part, at the start of each step (a), (b) or (c) to check that the image is stable within the established limits. These first operations comprise the steps of:
  pressing on button 22 (arrow 60) to trigger off the operations,
  performing a first series of measurements to obtain a first set of pairs of values $T1_{HAV1}$ and $T2_{HAV1}$, $T1_{VAV1}$ and $T2_{VAV1}$ (box 62),
  performing a second series of measurements to obtain a second set of pairs of values $T1_{HAV2}$ and $T2_{HAV2}$, $T1_{VAV2}$ and $T2_{VAV2}$ (box 64),
  subtracting the second set of pairs of values from the values from the first set (box 66) to obtain difference values DIFF in terms of absolute values,
  comparing the difference values DIFF with a threshold TMUDIFF (lozenge 68),
  stopping the operations if DIFF>TMUDIFF, for the image is then considered to be unstable or shifting, or passing onto the next operation (lozenge 70) in the opposite case.

Note that the series of measurements $T1_{AV}$ and $T2_{AV}$ which concern the horizontal deflection are preferably only performed just before each horizontal adjustment (a) or (b) to determine the horizontal stability of the image.

Likewise, the series of measurements $T1_{VAV}$ and $T2_{VAV}$, which concern the vertical deflection, are only performed just before the vertical adjustments, preferably for centering and dimensioning to determine the vertical image stability, comparing $T1_{HAV}$ and/or $T2_{HAV}$ (lozenge 70) with a maximum value MAX and stopping the operations if it is reached, for the image is then considered to be too small and hence not exploitable, or that the video signal is bad (lozenge 70); in the case of a negative comparison, passing on to the next operation, the first concerning the horizontal centering proper, which comprises the steps of:

checking whether the negative comparison arrives for the first time or not (lozenge 72), and in the case of a positive check, passing on to the next operation comprising the steps of:

comparing $T1_{HAV}$ with $T2_{HAV}$ (lozenge 74), and stopping the horizontal centering operations in the case of an inequality, for the image is already horizontally centered, and passing on to step (b), the image must be displaced to the right if $T1_{HAV} < T2_{HAV}$, such an event being memorized by a flag at the 0 state, the image must be displaced to the left if $T1_{HAV} > T2_{HAV}$, such an event being memorized by the flag, but in this case at the 1 state, in the case of a negative check, or in the case where the image must be displaced, passing on to the next operation.

The value 0 or 1 for the flag indicates the direction in which the image is to be displaced, the displacement being effected in a stepwise manner by incrementing or decrementing the centering adjustment value HPOS.

The following operations involve comparing $T1_{HAV}$ with $T2_{HAV}$ and modifying the centering adjustment value HPOS in the direction indicated by the value of the flag until detection of the equality $T1_{HAV} = T2_{HAV}$. These operations are presented in the diagram of FIG. 5-B.

The first operation (box 80) consists in checking whether the flag is at logic 1, indicating that the image is off-centered in the right direction and must be brought back to the left.

if the check is positive, the following operation consists in checking whether $T1_{HAV} > T2_{HAV}$ (lozenge 82), and there are three possible responses:

(i) $T1_{HAV} = T2_{HAV}$, in which case the image is centered and the horizontal centering operations are stopped to pass on to step (b), (ii) $T1_{HAV} > T2_{HAV}$, in which case the image is off-centered in the right direction and must be displaced to the left by decrementing the adjustment value HPOS by one unit (box 86); moreover, a loop counter 90 is incremented by one unit;

(iii) $T1_{HAV} < T2_{HAV}$, in which case the image which was off-centered in the right direction since the start of the operations is now off-centered towards the left, which means that the centering value HPOS has been exceeded by one unit. This overshoot is corrected by incrementing the horizontal adjustment value HPOS by one unit (box 94). With this incrementation, the value of HPOS corresponds to the center position, and the horizontal centering operations are stopped to pass on to step (b).

If the flag is not at logic 1, i.e. the image is off-centered to the left and must be brought back to the right, the following operation (box 84) consists in checking whether $T1_{HAV} < T2_{HAV}$, and there are three possible solutions as in the previous case:

(i) $T1_{HAV} = T2_{HAV}$, in which case the image is centered and the horizontal centering operations are stopped to pass on to step (b), (ii) $T1_{HAV} < T2_{HAV}$, in which case the image is off-centered in the left direction and must be displaced to the right by incrementing the adjustment value HPOS by one unit (box 88); moreover, a loop counter 90 is incremented by one unit;

(iii) $T1_{HAV} > T2_{HAV}$, in which case the image which was off-centered in the left direction since the start of the operations is now off-centered towards the right, which means that the centering value HPOS has been exceeded by one unit. This overshoot is corrected by decrementing the horizontal adjustment value HPOS by one unit (box 96). With this incrementation, the value of HPOS corresponds to the center position and the horizontal centering operations are stopped to pass on to step (b).

If the loop counter 90 is incremented, this means that the centering value HPOS has not yet been obtained and that it is necessary start again all the operations described above (new loop) starting from step 62 consisting of measuring new values of $T1_{HAV}$ and $T2_{HAV}$ subsequent to the new value of HPOS.

However, this new loop is performed only if the number of loops has not exceeded a certain threshold BMAX. The operation consists in:

comparing (lozenge 92) the contents of the loop counter 90 with BMAX, stopping the operations if the centering has not been achieved after a set number of shifts BMAX, or starting a new loop if BMAX is not attained.

To set the horizontal dimension of the image such that it takes up the entire width of the screen, i.e. without vertical black edges, it is necessary to change the amplitude setting for the current flowing in the horizontal deflection coil, such an adjustment being represented by a value HSIZE which can vary e.g. between 0 and 255. It is this value HSIZE for obtaining a maximum image width which is calculated by the method according to the invention, this value being dependent on many parameters, and notably $T1_{HAV}$ and $T2_{HAV}$.

The formula which enables to calculate HSIZE is:

$$HSIZE = \frac{A_{Vopti}(T'/Td') - H_{AMPMIN}}{H_{AMPMAX} - H_{AMPMIN}} \times HSIZE_{MAX}$$

In which formula:

$A_{Vopti}$ is the optimum amplitude of the current in the horizontal deflection coil to obtain an image of optimum width; this amplitude is measured for a type of cathode ray tube and in a reference video mode, $HSIZE_{MAX}$ is the maximum value of HSIZE, e.g. 255 as indicated above, $H_{AMPMAX}$ is the maximum variation of the current in the horizontal deflection coil to obtain a maximum horizontal deflection; this value varies as a function of the horizontal scanning frequency f(fH) as described below;

$H_{AMPMIN}$ is the minimum variation of the current in the horizontal deflection coil to obtain a minimum horizontal deflection; this value varies as a function of the horizontal scanning frequency f(fH) as described below;

T' is the total duration of a horizontal line, i.e. the duration of the period T of the horizontal synchronization signal, from which are subtracted the duration of the flyback pulse $T_{FLYBACK}$, in general three microseconds, and a duration of safety margins, e.g. 0.6 microseconds, and $$-Td'=T-(T1_{HAV}+T2_{HAV}+T_{FLYBACK})$$

i.e. the duration of the image on screen between these black edges.

This formula is established by supposing that the current varies linearly, which is not the case, so that to take into account the fact that the curve is S shaped, the coefficient applied $A_{Vopti}$ must be replaced by $$(1.8T'-Td')/2.8Td',$$

which coefficient can change depending on the type of cathode ray tube and its control device.

The values for $H_{AMPMIN}$ and $H_{AMPMAX}$ are determined by means of, curves as a function of the horizontal scanning frequency f(H), this being effected for frequency ranges.

For instance, curve 100 of FIG. 6 shows the function of $H_{AMPMIN}=f(fH)$ for a range of frequencies from 34 kHz to 41 kHz for the case of a given cathode ray tube. The abscissa x is graduated in kHz while the ordinate is graduated in $H_{AMP} \times 10$ mA. There is thus obtained a straight line whose equation is:

$$Y=-5.22x+1265.1=ax+b.$$

This equation is different for another range of frequencies.

Coefficients a and b determined for each range of frequencies are recorded in a memory so that they can be read in view of calculating $H_{AMPMIN}$ according to the horizontal scanning frequency.

$H_{AMPMAX}$ is obtained in the same manner as for $H_{AMPMIN}$.

As a result, if there are eight frequency ranges, there shall be sixteen pairs of coefficients (a,b) which define the sixteen variation curves, eight for $H_{AMPMIN}$ and eight for $H_{AMPMAX}$.

To achieve vertical centering and vertical dimensioning, the method according to the invention consists in measuring the values $T1_{VAV}$ and $T2_{VAV}$ for the image which appears on the screen, and then first calculating VSIZE to obtain the vertical dimensioning and subsequently VPOS' to obtain the vertical centering according to the following formulae:

$$VSIZE'=0.5[(3VSIZEMAX+2VSIZE)]\cdot[(Td\times T')/(TD'\times T)]-1.5(VSIZEMAX) \text{ and}$$

$$VPOS'=VPOS+(A-B)$$

with $$A=[(2.25+1.5.(VSIZE/VSIZEMAX)]\times[(0.5-T1/T).(VPOSMAX/0.6)]$$

and $$B=[(2.25+1.5.(VSIZE'/VSIZEMAX)]\times[0.5-T1'/T).(VPOSMAX/0.6)]$$

To define the parameters of these formulae, reference shall be made to FIG. 7, which shows the sawtooth for vertical scanning 40, but inversed with respect to that of FIG. 3. The abscissa shows the duration and the ordinate shows the voltage $V_{OUT}$. On this sawtooth is placed the image 112 to be vertically centered and dimensioned and a reference image which is appropriately vertically centered and dimensioned.

In FIG. 7, $T_1$, $T_2$ correspond in time periods respectively to the start and end of the reference image 114, while T1' and T2' correspond in time periods respectively to the start and end of the image 112 to be centered and dimensioned. The following relations are then established:

The duration Td of the reference image is given by Td=T2−T1, and the duration Td' of the image to be centered is given by Td'=T2'−T1'.

Also, $T1=T1_{VAV}$ and $T2=T-T2_{VAV}$, T being the total duration of a sawtooth. Similarly, $T1'=T1'_{VAV}$ and $T2'=T'-T2'_{VAV}$.

The reference image 114 is obtained by a manual adjustment in a reference video mode on a given type of cathode ray tube and the values $T1_{VAV}$ and $T2_{VAV}$ are measured and entered into a memory to be used for the automatic adjustments on that type of cathode ray tube. The same applies for the value VSIZE, which corresponds to that reference image, while VZIZEMAX is the maximum adjustment value, for example 256.

These elements allow to calculate the value VSIZE' according to the above formula, i.e. the adjustment value that will allow to obtain an image which is appropriately vertically dimensioned.

By knowing VSIZE', it is possible to calculate VPOS' according to the above formula, which also uses the value VPOSMAX, which is the maximum adjustment for the vertical centering.

The invention has been described in its application to the adjustment of a cathode ray tube by the user of a computer or a television set in which the cathode ray tube forms the display screen. The invention also applies to the implementation of the process for adjusting the horizontal and vertical deflection coils at the end of a cathode ray tube production line.

Indeed, at the end of a cathode ray tube production line, the image generated to test for the correct operation of the cathode ray tube exhibits faults which an operator corrects in various ways. One of the faults concerns a bad alignment between the image and screen centers and, to correct it, the operator first performs image centering and dimensioning adjustments using the buttons 20 (FIG. 1-A) and then the adjustments in the electronic and magnetic circuits (deflection coils) to displace the image center and make it coincide with the center of the screen. In this sequence of operations, the method of the invention can be implemented to obtain the centering HPOS and HPOS', and possibly the dimensioning HSIZE and VSIZE'.

For this adjustment, the operations to be performed would then be as follows:

display a calibrated image, for example a white image with a perfectly centered cross, launch the process of the invention wholly or in part, modify the electronic and magnetic settings for the screen to bring the cross to the center of the screen.

The invention claimed is:

1. A display comprising
a cathode ray tube for displaying an image thereon; and
a calculation circuit connected to said cathode ray tube for centering and dimensioning the image being displayed by
 (a) measuring durations of vertical border edges of the image and iteratively modifying adjustment values for a horizontal centering of the image to obtain equal lateral vertical edges,
 (b) measuring the durations of the vertical border edges of the image to calculate adjustment values for a horizontal dimension of the image to cause the vertical border edges to disappear, and (c) measuring durations of horizontal border edges of the image to calculate adjustment values of a vertical dimension of the image, and to calculate adjustment values of a vertical centering of the image to cause the horizontal border edges to disappear and to center the image vertically;

said calculation circuit further checking stability of the image at a start of at least one of the steps (a), (b) and (c), by (a$_0$) measuring a pair of durations of at least one of the vertical and horizontal border edges of the image, (a$_1$) subtracting two successive measurements to determine a variation in the durations, (a$_2$) comparing the variation with a first threshold, and stopping if the first threshold is exceeded or continuing if the first threshold is not exceeded, and (a$_3$) comparing the measurements with a second threshold, and stopping if the second threshold is exceeded or continuing with at least one of steps (a), (b) and (c) if the second threshold is not exceeded.

2. A display according to claim 1, further comprising a display calculator connected to said cathode ray tube for providing display signals thereto.

3. A display according to claim 2, wherein said display calculator comprises a memory for recording the adjustment values obtained.

4. A display according to claim 1, wherein the durations of the vertical border edges of the image are indicated by variables T1$_{HAV}$ and T2$_{HAV}$; and wherein said calculation circuit further comprises performing:

(a$_4$) checking that the measurements of the durations T1$_{HAV}$ and T2$_{HAV}$ are a first measurement since a start of steps (a), (b) or (C), and if a response of the checking is negative, then passing on to a sub-step (a$_6$), and if the response of the checking is positive, then passing on to a substep (a$_5$); and (a$_5$) comparing the measurements for T1$_{HAV}$ and T2$_{HAV}$.

5. A display according to claim 4, wherein step (a$_4$) further comprises:

setting a flag to a first logic value if T1$_{HAV}$<T2$_{HAV}$ to indicate that the image is to be displaced towards the right;

setting the flag to a second logic value if T1$_{HAV}$<T2$_{1HAV}$ to indicate that the image is to be displaced towards the left; and stopping the horizontal centering if T1$_{HAV}$=T2$_{HAV}$, since the image is centered horizontally, and passing on to step (b).

6. A display according to claim 5, wherein said calculation circuit further comprises performing:

(a$_6$) checking whether the flag is at the second logic value, and if the checking is a positive response, then passing on to a next sub-step (a$_7$), and if the checking is a negative response, then passing on to a sub-step (a$_8$);

(a$_7$) checking whether T1$_{HAV}$<T2$_{HAV}$, and if T1$_{HAV}$=T2$_{HAV}$ since the image is horizontally centered, then stopping, and if the checking is a positive response, then passing on to a sub-step (a$_9$), and if the checking is a negative response, then passing on to a sub-step (a$_{10}$);

(a$_8$) checking whether T1$_{HAV}$<T2$_{HAV}$, and if T1$_{HAV}$=T2$_{HAV}$, since the image is horizontally centered, then passing on to step (b), and if the checking is a positive response, then passing on to a sub-step (a$_{11}$), and if the checking is a negative response, then passing on to a sub-step (a$_{12}$).

7. A display according to claim 6, wherein said calculation circuit further comprises performing:

(a$_9$) decrementing by one unit the adjustment value for centering the image to displace the image by one incremental step to the left, and passing on to a sub-step (a$_{13}$);

(a$_{10}$) incrementing by one unit the adjustment value for centering the image to displace the image towards the right, since the image had been displaced by one incremental step too far towards the left, and stopping the horizontal centering since the image is centered horizontally and passing on to step (b);

(a$_{11}$) incrementing by one unit the adjustment value for centering the image to displace the image by one incremental step to the right, and passing on to sub-step (a$_{13}$);

(a$_{12}$) decrementing by one unit the adjustment value for centering the image to displace the image towards the left, since the image had been displaced by one incremental step too far towards the right, and stopping the horizontal centering since the image is centered horizontally and passing on to step (b);

(a$_{13}$) incrementing a loop counter by one unit each time the sub-step (a$_9$) or (a$_{11}$) has been performed, then passing on to a following sub-step (a$_{14}$); and (a$_{14}$) checking whether content of the loop counter has attained a third threshold, and if the checking is a positive answer, then stopping on account of an impossibility of adjustment, and if the checking is a negative answer, then restarting the loop at step (a$_2$).

8. A display according to claim 1, wherein the durations of the vertical border edges of the image are indicated by variables T$_{HAV}$ and T2$_{HAV}$; and wherein calculating the adjustment of the horizontal dimension of the image in step (b) is based upon the formula:

$$HSIZE = \frac{A_{Vopti}(T'/Td') - H_{AMPMIN}}{H_{AMPMAX} - H_{AMPMIN}} \times HSIZE_{MAX}$$

wherein:

A$_{vopti}$ is an optimum amplitude of a current in a horizontal deflection coil of the cathode ray tube to obtain an image of optimum width, with the amplitude being measured for a type of cathode ray tube, HSIZE$_{MAX}$ is a maximum value of the adjustment of the horizontal dimension of the image, H$_{AMPMAX}$ is a maximum variation of a current in the horizontal deflection coil to obtain a maximum horizontal deflection, this value varies as a function of a horizontal scanning frequency;

H$_{AMPMIN}$ is a minimum variation of the current in the horizontal deflection coil to obtain a minimum horizontal deflection, this value varies as a function of the horizontal scanning frequency;

T' is a total duration of a period T of a horizontal synchronization signal, from which are subtracted a duration of a flyback pulse TFLYBACK and a duration of safety margins, and Td'=T−(T1$_{HAV}$+T2$_{HAV}$+T$_{FLYBACK}$), which is a duration of the image on the screen between the border edges.

9. A display according to claim 8, wherein the coefficient (T'/Td') in the formula is replaced by 1.8T'−Td'/2.8Td' to take into account a form of a curve for the current in the horizontal deflection coil.

10. A display according to claim 1, wherein the durations of the horizontal border edges of the image are indicated by variables $T1_{VAV}$ and $T2_{VAV}$; and wherein calculating the adjustment of the vertical dimension of the image in step (c) is based upon the formula:

$$VSIZE'=0.5[(3VSIZEMAX+2VSIZE)].[(Td \times T')/(Td' \times T)]1.5 \, (VSIZEMAX);$$

and wherein calculating the adjustment of the vertical centering of the image in step (c) is based upon the formula:

$$VPOS'=VPOS+(A-B), \text{ with } A=[(2.25+1.5.(VSIZE/VSIZEMAX)] \times [(0.5-T1/T').(VPOSMAX/0.6)],$$
$$\text{and } B=[(2.25 \, 1.5. \, (VSIZE'/VSIZEMAX)] \times [0.5-T1/T'). \, (VPOSMAX/0.6)],$$

wherein:

Td is a duration of a reference image such that:

$$Td=T2-T1 \text{ with } T1=T1_{VAV} \text{ and } T2=T-T2_{VAV},$$

T is a total duration of a vertical scanning sawtooth,

Td' is a duration of the image to dimension and to center such that:

$$Td'=T2'-T1' \text{ with } T1'=T1'_{VAV} \text{ and } T2'=T'-T2'_{VAV},$$

VSIZE is an adjustment value for the vertical dimension of the reference image,

VSIZEMAX is a maximum adjustment value for the vertical dimension of the image,

VPOS is an adjustment for the vertical centering of the reference image, and

VPOSMAX is a maximum adjustment value for the vertical centering.

11. A display comprising
a cathode ray tube for displaying an image thereon; and
a calculation circuit connected to said cathode ray tube for horizontal centering and horizontal dimensioning the image being displayed on said screen by
  (a) measuring durations of vertical border edges of the image and iteratively modifying adjustment values for a horizontal centering of the image to obtain equal lateral vertical edges, and
  (b) measuring the durations of the vertical border edges of the image to calculate adjustment values for a horizontal dimension of the image to cause the vertical border edges to disappear;
said calculation circuit further checking for stability of the image by
  ($a_0$) measuring a pair of durations of at least one of the vertical and horizontal border edges of the image,
  ($a_1$) subtracting two successive measurements to determine a variation in the durations,
  ($a_2$) comparing the variation with a first threshold, and stopping if the first threshold is exceeded or continuing if the first threshold is not exceeded, and
  ($a_3$) comparing the measurements with a second threshold, and stopping if the second threshold is exceeded or continuing with at least one of steps (a) and (b) if the second threshold is not exceeded.

12. A display according to claim 11, further comprising a display calculator connected to said cathode ray tube for providing display signals thereto.

13. A display according to claim 11, wherein the durations of the vertical border edges of the image are indicated by variables $T1_{HAV}$ and $T2_{HAV}$; and wherein said calculation circuit further comprises performing:
  ($a_4$) checking that the measurements of the durations $T1_{HAV}$ and $T2_{HAV}$ are a first measurement since a start of steps (a) or (b), and if a response of the checking is negative, then passing on to a sub-step ($a_6$), and if the response of the checking is positive, then passing on to a sub-step ($a_5$); and
  ($a_5$) comparing the measurements for $T1_{HAV}$ and $T2_{HAV}$.

14. A display according to claim 13, wherein step ($a_4$) further comprises:
  setting a flag to a first logic value if $T1_{HAV} < T2_{HAV}$ to indicate that the image is to be displaced towards the right;
  setting the flag to a second logic value if $T1_{HAV} < T2_{HAV}$ to indicate that the image is to be displaced towards the left; and
  stopping the horizontal centering if $T1_{HAV} = T2_{HAV}$, since the image is centered horizontally, and passing on to step (b).

15. A display according to claim 14, wherein said calculation circuit further comprises performing:
  ($a_6$) checking whether the flag is at the second logic value, and if the checking is a positive response, then passing on to a next sub-step ($a_7$), and if the checking is a negative response, then passing on to a substep ($a_8$);
  ($a_7$) checking whether $T1_{HAV} < T2_{HAV}$, and if $T1_{HAV} = T2_{HAV}$ since the image is horizontally centered, then stopping, and if the checking is a positive response, then passing on to a sub-step ($a_9$), and if the checking is a negative response, then passing on to a sub-step ($a_{10}$); and
  ($a_8$) checking whether $T1_{HAV} < T2_{HAV}$, and if $T1_{HAV} = T2_{HAV}$, since the image is horizontally centered, then passing on to step (b), and if the checking is a positive response, then passing on to a sub-step ($a_{11}$), and if the checking is a negative response, then passing on to a sub-step ($a_{12}$).

16. A display according to claim 15, wherein said calculation circuit further comprises performing:
  ($a_9$) decrementing by one unit the adjustment value for centering the image to displace the image by one incremental step to the left, and passing on to a sub-step ($a_{13}$);
  ($a_{10}$) incrementing by one unit the adjustment value for centering the image to displace the image towards the right, since the image had been displaced by one incremental step too far towards the left, and stopping the horizontal centering since the image is centered horizontally and passion to step (b);
  ($a_{11}$) incrementing by one unit the adjustment value for centering the image to displace the image by one incremental step to the right, and passing on to sub-step ($a_{13}$);
  ($a_{12}$) decrementing by one unit the adjustment value for centering the image to displace the image towards the left, since the image had been displaced by one incremental step too far towards the right, and stopping the horizontal centering since the image is centered horizontally and passing on to step Cb);
  ($a_{13}$) incrementing a ioop counter by one unit each time the sub-step ($a_9$) or ($a_{11}$) has been performed, then passing on to a following sub-step ($a_{14}$); and
  ($a_{14}$) checking whether content of the loop counter has attained a third threshold, and if the checking is a positive answer, then stopping on account of an impossibility of adjustment, and if the checking is a negative answer, then restarting the loop at step ($a_2$).

17. A display according to claim 11, wherein the durations of the vertical border edges of the image are indicated by variables $T1_{HAV}$ and $T2_{HAV}$; and wherein calculating the adjustment of the horizontal dimension of the image in step (b) is based upon the formula:

$$HSIZE = \frac{A_{Vopti}(T'/Td') - H_{AMPMIN}}{H_{AMPMAX} - H_{AMPMIN}} \times HSIZE_{MAX}$$

wherein:

$A_{vopti}$ is an optimum amplitude of a current in a horizontal deflection coil of the cathode ray tube to obtain an image of optimum width, with the amplitude being measured for a type of cathode ray tube, $HSIZE_{MAX}$ is a maximum value of the adjustment of the horizontal dimension of the image, $H_{AMPMAX}$ is a maximum variation of a current in the horizontal deflection coil to obtain a maximum horizontal deflection, this value varies as a function of a horizontal scanning frequency;

$H_{AMPMIN}$ is a minimum variation of the current in the horizontal deflection coil to obtain a minimum horizontal deflection, this value varies as a function of the horizontal scanning frequency;

T' is a total duration of a period T of a horizontal synchronization signal, from which are subtracted a duration of a flyback pulse $T_{FLYBACK}$ and a duration of safety margins, and Td'=T ($T1_{HAV}$+$T2_{HAV}$+$T_{FLYBACK}$), which is a duration of the image on the screen between the border edges.

18. A display according to claim 17, wherein the coefficient (T'/Td') in the formula is replaced by 1.8T'-Td'/2.8Td' to take into account a form of a curve for the current in the horizontal deflection coil.

19. A display comprising
a cathode ray tube for displaying an image thereon; and
a calculation circuit connected to said cathode ray tube for centering and dimensioning the image being displayed by
(a) measuring durations of vertical border edges of the image and iteratively modifying adjustment values for a horizontal centering of the image to obtain equal lateral vertical edges,
(b) measuring the durations of the vertical border edges of the image to calculate adjustment values for a horizontal dimension of the image to cause the vertical border edges to disappear, and
(c) measuring durations of horizontal border edges of the image to calculate adjustment values of a vertical dimension of the image, and to calculate adjustment values of a vertical centering of the image to cause the horizontal border edges to disappear and to center the image vertically;
said calculation circuit indicates durations of the vertical border edges of the image by variables $T1_{HAV}$ and $T2_{HAV}$; and calculates the adjustment of the horizontal dimension of the image in step (b) is based upon the formula:

$$HSIZE = \frac{A_{Vopti}(T'/Td') - H_{AMPMIN}}{H_{AMPMAX} - H_{AMPMIN}} \times HSIZE_{MAX}$$

wherein:

$A_{vopti}$ is an optimum amplitude of a current in a horizontal deflection coil of the cathode ray tube to obtain an image of optimum width, with the amplitude being measured for a type of cathode ray tube, $HSIZE_{MAX}$ is a maximum value of the adjustment of the horizontal dimension of the image, $H_{AMPMAX}$ is a maximum variation of a current in the horizontal deflection coil to obtain a maximum horizontal deflection, this value varies as a function of a horizontal scanning frequency, $H_{AMPMIN}$ is a minimum variation of the current in the horizontal deflection coil to obtain a minimum horizontal deflection, this value varies as a function of the horizontal scanning frequency, T' is a total duration of a period T of a horizontal synchronization signal, from which are subtracted a duration of a flyback pulse $T_{FLYBACK}$ and a duration of safety margins, and Td'=T ($T1_{HAV}$+$T2_{HAV}$+$T_{FLYBACK}$), which is a duration of the image on the screen between the border edges.

20. A display according to claim 19, further comprising a display calculator connected to said cathode ray tube for providing display signals thereto, and wherein said display calculator comprises a memory for recording the adjustment values obtained.

21. A display according to claim 19, wherein said calculation circuit further checks for stability of the image by
($a_0$) measuring a pair of durations of at least one of the vertical and horizontal border edges of the image;
($a_1$) subtracting two successive measurements to determine a variation in the durations;
($a_2$) comparing the variation with a first threshold, and stopping if the first threshold is exceeded or continuing if the first threshold is not exceeded; and
($a_3$) comparing the measurements with a second threshold, and stopping if the second threshold is exceeded or continuing with at least one of steps (a) and (b) if the second threshold is not exceeded.

22. A display according to claim 21, wherein the durations of the vertical border edges of the image are indicated by variables $T1_{HAV}$ and $T2_{HAV}$; and wherein said calculation circuit further comprises performing:
($a_4$) checking that the measurements of the durations $T1_{HAV}$ and $T2_{HAV}$ are a first measurement since a start of steps (a), (b) or (c), and if a response of the checking is negative, then passing on to a sub-step ($a_6$), and if the response of the checking is positive, then passing on to a sub-step ($a_5$); and
($a_5$) comparing the measurements for $T1_{HAV}$ and $T2_{HAV}$.

23. A display according to claim 22, wherein step ($a_4$) further comprises:
setting a flag to a first logic value if $T1_{HAV}$<$T2_{HAV}$ to indicate that the image is to be displaced towards the right;
setting the flag to a second logic value if $T1_{HAV}$<$T2_{HAV}$ to indicate that the image is to be displaced towards the left; and
stopping the horizontal centering if $T1_{HAV}$=$T2_{HAV}$, since the image is centered horizontally, and passing on to step (b).

24. A display according to claim 23, wherein said calculation circuit further comprises performing:
- ($a_6$) checking whether the flag is at the second logic value, and if the checking is a positive response, then passing on to a next sub-step ($a_7$), and if the checking is a negative response, then passing on to a sub-step ($a_8$);
- ($a_7$) checking whether $T1_{HAV} < T2_{HAV}$, and if $T1_{HAV} = T2_{HAV}$ since the image is horizontally centered, then stopping, and if the checking is a positive response, then passing on to a sub-step ($a_9$), and if the checking is a negative response, then passing on to a sub-step ($a_{10}$); and
- ($a_8$) checking whether $T1_{HAV} < T2_{HAV}$, and if $T1_{HAV} = T2_{HAV}$, since the image is horizontally centered, then passing on to step (b), and if the checking is a positive response, then passing on to a sub-step ($a_{11}$), and if the checking is a negative response, then passing on to a sub-step ($a_{12}$).

25. A display according to claim 24, wherein said calculation circuit further comprises performing:
- ($a_9$) decrementing by one unit the adjustment value for centering the image to displace the image by one incremental step to the left, and passing on to a sub-step ($a_{13}$);
- ($a_{10}$) incrementing by one unit the adjustment value for centering the image to displace the image towards the right, since the image had been displaced by one incremental step too far towards the left, and stopping the horizontal centering since the image is centered horizontally and passing on to step (b);
- ($a_{11}$) incrementing by one unit the adjustment value for centering the image to displace the image by one incremental step to the right, and passing on to sub-step ($a_{13}$);
- ($a_{12}$) decrementing by one unit the adjustment value for centering the image to displace the image towards the left, since the image had been displaced by one incremental step too far towards the right, and stopping the horizontal centering since the image is centered horizontally and passing on to step (b);
- ($a_{13}$) incrementing a loop counter by one unit each time the substep ($a_9$) or ($a_{11}$) has been performed, then passing on to a following sub-step ($a_{14}$); and
- ($a_{14}$) checking whether content of the loop counter has attained a third threshold, and if the checking is a positive answer, then stopping on account of an impossibility of adjustment, and if the checking is a negative answer, then restarting the loop at step ($a_2$).

26. A display according to claim 19, wherein the coefficient (T'/Td') in the formula is replaced by 1.8T'−Td'/2.8Td' to take into account a form of a curve for the current in the horizontal deflection coil.

* * * * *

UNITED STATES PATENT AND TRADEMARK OFFICE
CERTIFICATE OF CORRECTION

PATENT NO. : 7,215,378 B2
APPLICATION NO. : 10/344546
DATED : May 8, 2007
INVENTOR(S) : Janin et al.

It is certified that error appears in the above-identified patent and that said Letters Patent is hereby corrected as shown below:

The Title Page, showing an illustrative figure, should be deleted and substitute therefor the attached title page.

Please replace all the drawings with new Figures 1-7 as attached.

Please replace the specification with the attached substituted specification.

Signed and Sealed this

Twenty-first Day of December, 2010

David J. Kappos
*Director of the United States Patent and Trademark Office*

(12) United States Patent
Janin et al.

(10) Patent No.: US 7,215,378 B2
(45) Date of Patent: May 8, 2007

(54) METHOD FOR CENTERING AND DIMENSIONING AN IMAGE ON A CATHODE-RAY TUBE

(75) Inventors: Pascal Janin, Tullins (FR); Laurent Vera, Edinburgh (GB); Hervé Pierrot, Saint Egreve (FR)

(73) Assignee: STMicroelectronics SA, Montrouge (FR)

( * ) Notice: Subject to any disclaimer, the term of this patent is extended or adjusted under 35 U.S.C. 154(b) by 679 days.

(21) Appl. No.: 10/344,546

(22) PCT Filed: Sep. 7, 2001

(86) PCT No.: PCT/FR01/02790

§ 371 (c)(1),
(2), (4) Date: Feb. 11, 2003

(87) PCT Pub. No.: WO02/21491

PCT Pub. Date: Mar. 14, 2002

(65) Prior Publication Data

US 2004/0012716 A1    Jan. 22, 2004

(30) Foreign Application Priority Data

Sep. 8, 2000 (FR) .................................. 00 11482

(51) Int. Cl.
*H04N 9/74* (2006.01)

(52) U.S. Cl. .................. 348/511; 348/581; 348/704

(58) Field of Classification Search .............. 348/511, 348/745, 747, 580–581, 704, 806–807, 184–191, 348/181; 315/370–371; *H04N 5/04, 3/22, H04N 9/14*

See application file for complete search history.

(56) References Cited

U.S. PATENT DOCUMENTS

| | | | |
|---|---|---|---|
| 5,654,743 A * | 8/1997 | Hu et al. | 345/213 |
| 5,713,040 A * | 1/1998 | Lee | 345/214 |
| 5,764,302 A | 6/1998 | Park | 348/542 |
| 5,801,767 A * | 9/1998 | Wu | 348/190 |
| 6,259,483 B1 * | 7/2001 | Jiang et al. | 348/511 |
| 6,259,484 B1 * | 7/2001 | Jiang et al. | 348/511 |
| 6,262,765 B1 * | 7/2001 | Jeong | 348/180 |

FOREIGN PATENT DOCUMENTS

| | | |
|---|---|---|
| DE | 19724409 | 12/1998 |
| DE | 19822311 | 4/1999 |

* cited by examiner

Primary Examiner—Trang U. Tran
(74) Attorney, Agent, or Firm—Lisa K. Jorgenson; Allen, Dyer, Doppelt, Milbrath & Gilchrist, P.A.

(57) ABSTRACT

A method for centering and dimensioning an image on a cathode ray tube receiving display signals supplied by a display calculator includes measuring durations of vertical black edges of the image, and modifying adjustment values for a horizontal centering of the image to obtain equal lateral vertical edges. The method further includes measuring the durations of the vertical black edges of the image to calculate adjustment values for a horizontal dimension of the image to cause the vertical black edges to disappear. Durations of the horizontal black edges of the image are measured to calculate adjustment values of a vertical dimension of the image, and to calculate adjustment values of a vertical centering of the image to cause the horizontal black edges to disappear for centering the image vertically. The adjustment values obtained are recorded in a memory of the display calculator.

26 Claims, 5 Drawing Sheets

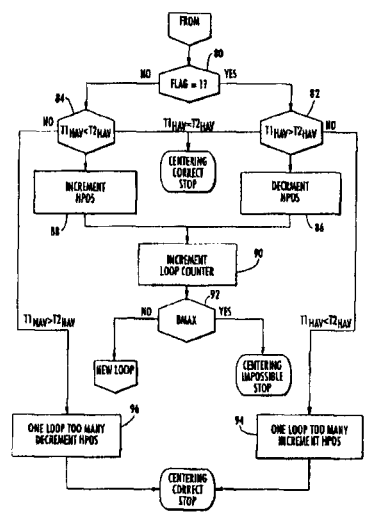

METHOD OF CENTERING AND DIMENSIONING AN IMAGE ON A CATHODE RAY TUBE

Field of the Invention

The present invention relates to cathode ray tubes for displaying images on television (TV) sets and personal computers (PC), and more particularly, to a method of automatically centering and dimensioning a displayed image.

Background of the Invention

A cathode ray tube for displaying images on a screen formed by its faceplate generally comprises electronic circuits which control the scanning of the screen by an electron beam so as to activate the luminescence of screen pixels, and thus produce the desired image.

These electronic scanning circuits are driven via a display controller through electrical signals which can have different sources, such as computer signals, signals from laser disks or game consoles. Because of their diversity, a same setting for the size and position of the image cannot be suitable for all sources. This can result in an undesirable centering of the image on the screen and in a distorted image. Moreover, these defects can exist for a cathode ray tube from the factory in the case where the settings are not properly adjusted. This can account for the presence of black stripes on the vertical or horizontal edges of the image, a horizontal or vertical shift of the image, or an image distortion in the horizontal or vertical direction.

Currently, these faults are corrected manually by the user through control buttons which bring up adjustment menus and sub-menus. Such an operating procedure is neither fast nor simple. This is notably due to the fact that there are only few control buttons which requires the user to employ a same button for several different functions. This is all the more inconvenient as these adjustments must be made as a function of the screen's operating mode, for example, to pass from one video mode to another, or from a traditional 640 x 480 pixel screen to a higher definition 1280 x 1024 pixel screen.

Accordingly, when changing from one video mode to another, the display calculator analyzes the new horizontal and vertical synchronization signals, calculates their frequencies and carries out the necessary adjustments to display a new image in the new mode. However, the image obtained is never perfectly adapted to the screen size, and consequently suffers from faults with regards to centering and dimensioning or to size as mentioned above.

Therefore, in the state of the art, the user must activate the control buttons provided for that purpose until the desired image is obtained, and the adjustments made are written into a memory of the display calculator, not only for the current session, but also for later sessions with the same display mode. However, despite this memory storage of the settings, the user often needs to readjust the latter during a subsequent use of the same display mode, and all the more so as the settings of the mode entered in memory are not always adapted to all software which use that mode.

Summary of the Invention

In view of the foregoing background, an object of the present invention is to implement a process for automatically centering and dimensioning an image on the screen of a cathode ray tube.

This and other objects, advantages and features are provided by a method for centering and dimensioning an image on a cathode ray tube whose display signals are supplied by a display calculator, wherein the method comprises the following steps:

(a) measuring the durations of the vertical black edges of the image and modifying step by step the adjustment for horizontal centering to obtain equal lateral vertical edges;

(b) measuring the durations of the vertical black edges of the image to calculate the adjustment of the horizontal dimension of the image so as to cause the vertical black edges to disappear;

(c) measuring the durations of the horizontal black edges of the image to calculate the adjustment of the vertical dimension of the image, and the adjustment of the vertical centering of the image so as to cause the horizontal black edges to disappear and to center the image vertically; and (d) recording the adjustment values obtained in a memory of the display calculator.

Steps (a), (b) and (c) can be performed in any order because they are independent of each other, but it is preferable to perform step (a) before step (b), given that the precision for the calculation of the setting for the horizontal dimension of the image depends on the perfect horizontal centering of the image. Step (d) may be performed after each step (a), (b) or (c) to record the value of the setting obtained by the step having just been finished.

The method is implemented only if the image is sufficiently stable. Stability is detected by checking that the positions of the vertical and horizontal edges have fluctuations below a certain threshold. This stability may be checked before each step (a), (b) and (c).

Brief Description of the Drawings

Other characteristics and advantages of the present invention shall become apparent from reading the following description of a preferred embodiment, in relation with appended drawings in which.

Detailed Description of the Preferred Embodiments

Figure 1A:
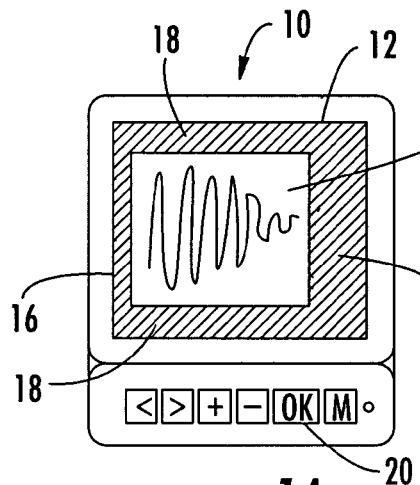
FIG. 1A shows an image on a screen of a cathode ray tube which is not centered and exhibits a black border.

FIG. 1A shows the faceplate 10 of a cathode ray tube 12, on the screen of which appears an image 14 whose vertical edges 16 and horizontal edges 18 are black (i.e., dark). The black edges indicate that the image 14 is not centered at the center of the screen, and that it only occupies a part of the screen.

As indicated in the introductory portion above, the adjustments for centering and dimensioning the image are at present made by the user through buttons 20 which bring down menus and sub-menus on the screen to guide the user in the adjustments. These control buttons 20 are active for the adjustments via a display calculator which supplies the values of horizontal and vertical scanning signals. This display calculator is capable of receiving the video signals and analyzing them to output these scanning signals.

Figure 1B:
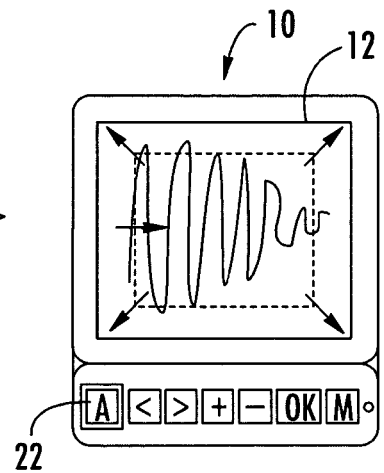
FIG. 1B shows the same image after implementation of the process in accordance with the present invention.

In accordance with the invention, a control button 22 is added to implement the inventive process and obtain in a few seconds the correctly centered and dimensioned image of FIG. 1B. The process of the invention is based on the measurement of the length, in units of time, of vertical and horizontal black edges. These measurements then serve for carrying out algorithmic operations and calculations leading to a modification of the image centering and its dimensions.

Figure 2:
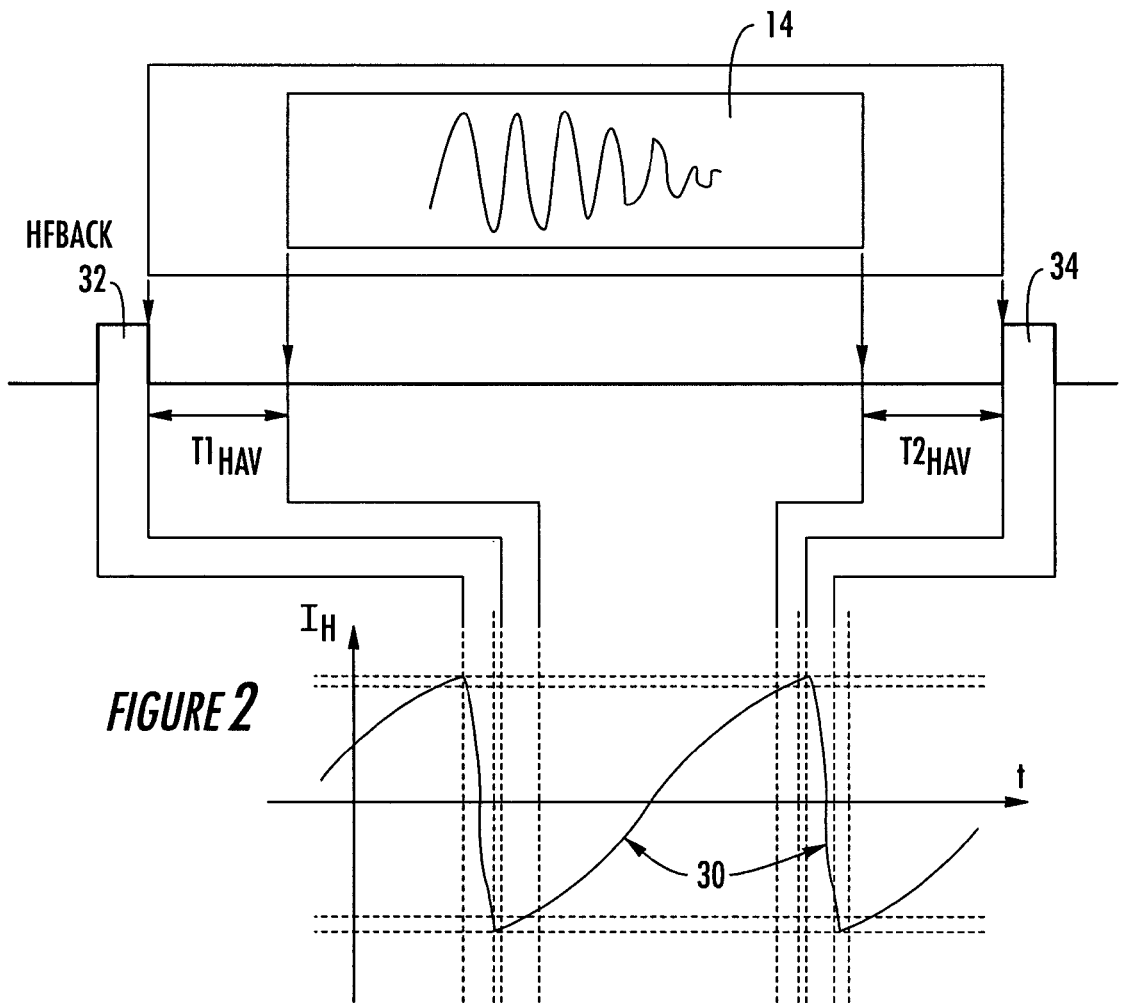
FIG. 2 is a diagram showing the relationship between the horizontal position of the image on a screen, and the horizontal scanning signal for an image line in accordance with the present invention.

FIG. 2 shows the image 14 and the corresponding horizontal scanning signal 30 as a function of time t for a line of the image, i.e., the current $I_H$ flowing in the horizontal deflection coil (yoke). The figure also shows the horizontal synchronization pulses 32 and 34 (HFBACK) which determine the start and end points of a horizontal scanning signal. The start of horizontal scanning corresponds to the falling edge of pulse 32, and the end corresponds to the rising edge of pulse 34. The duration of the scanning return (flyback) is given by the duration of pulse 32 or 34.

When the image exhibits vertical black edge portions, this comes from the fact that signals of the red, green and blue components at the start and end of horizontal scanning are all below a certain level. The measure of the time duration $T1_{HAV}$ between the falling edge and the start of the left of the image indicates the extent of the left vertical black edge portion, while a measure of $T2_{HAV}$ between the end of the right of the image and the rising edge indicates the extent of the right vertical black edge portion.

It then follows that if $T1_{HAV} = T2_{HAV}$, then the image is centered horizontally, whereas it is not centered if $T1_{HAV}$ is different from $T2_{HAV}$. The process in accordance with the invention obtains horizontal centering of the image by measuring $T1_{HAV}$ and $T2_{HAV}$ in a repetitive manner; comparing $T1_{HAV}$ and $T2_{HAV}$ at each time; displacing the image by one unit towards the right if $T1_{HAV} < T2_{HAV}$ and to the left if $T1_{HAV} > T2_{HAV}$ until $T1_{HAV} = T2_{HAV}$ is obtained.

The measurement of $T1_{HAV}$ and $T2_{HAV}$ is performed by the display calculator using a device provided to that effect, which is readily known by one skilled in the art. $T1_{HAV}$ and $T2_{HAV}$ do not allow obtaining of the horizontal dimensioning of the image for making the vertical black edge portions disappear, since the time interval between two horizontal synchronization pulses 32 and 34 is fixed, irrespective of the horizontal width of the image. The process of the invention produces this horizontal dimensioning by modifying the amplitude of the curve 30 in accordance with a formula, as shall be described below.

Figure 3:
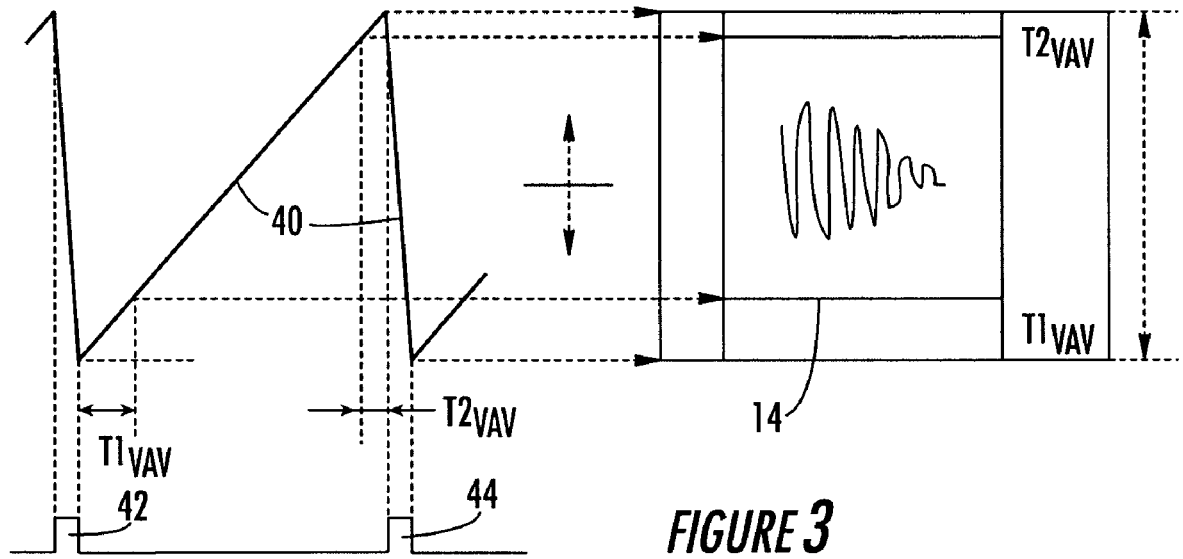
FIG. 3 is a diagram analogous to that of FIG. 2, but showing the relationship between the vertical position of the image on the screen and the vertical scanning signal for a complete image in accordance with the present invention.

FIG. 3 shows the image 14 and the corresponding vertical scanning signal 40 as a function of time t for a complete image, i.e., the voltage $V_v$ of the vertical deflection sawtooth signal for line-by-line vertical screen scanning. The figure also shows the vertical synchronization signals 42 and 44 (VFBACK) which determine the start and end points of a vertical scanning signal. The duration of the pulse determines the duration of the return period for the vertical scanning signal.

As in the case of horizontal line scanning, the time periods $T1_{VAV}$ and $T2_{VAV}$ respectively define the extent of the top black edge portion and the bottom black edge portion of the image. However, these time periods cannot be used to center the image vertically because the time interval between the top and bottom edges of the image and the corresponding pulses 42 and 44 remain constant irrespective of the vertical position of the image.

Likewise, the time periods $T1_{VAV}$ and $T2_{VAV}$ cannot serve directly for vertically dimensioning the image because the time period of the vertical synchronization pulses 42, 44 remains the same irrespective of the image height. The measurement of $T1_{VAV}$ and $T2_{VAV}$ is carried out by the display calculator using the above-mentioned measuring device for measuring $T1_{HAV}$ and $T2_{HAV}$.

Figure 4:
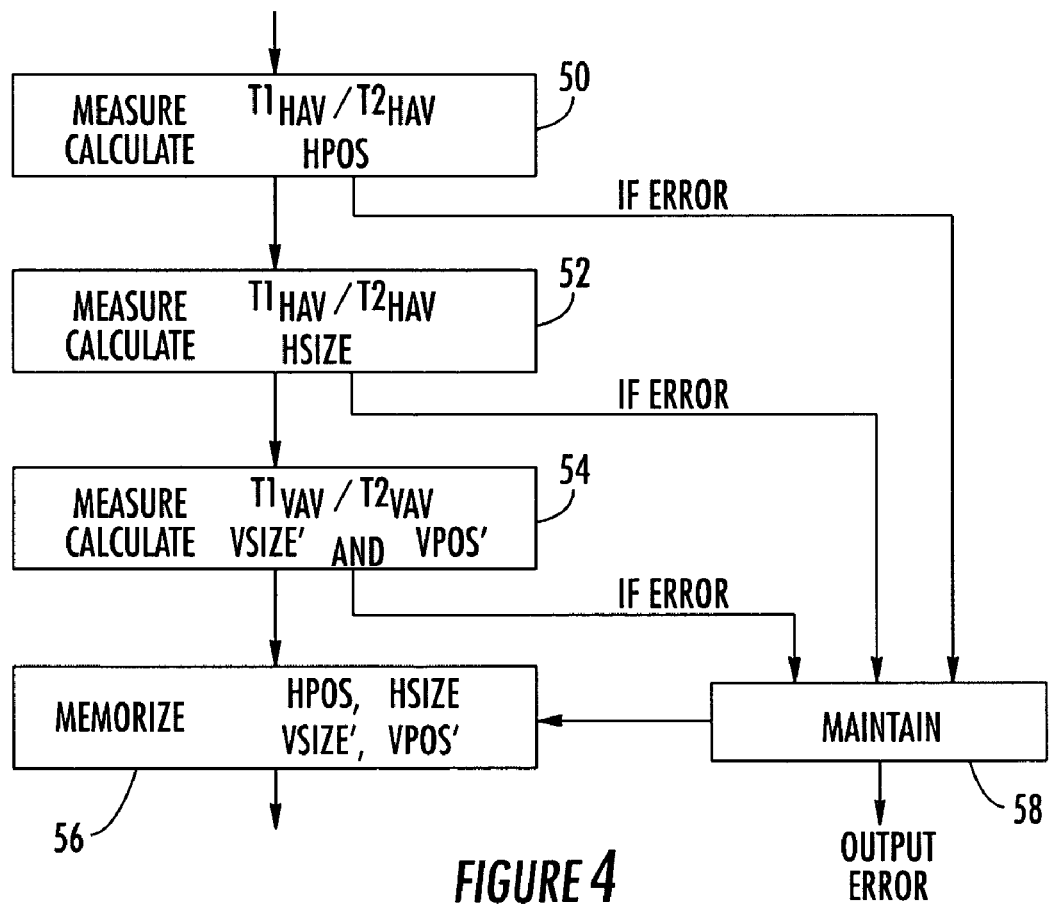
FIG. 4 is a diagram showing the main steps of the process in accordance with the present invention.

The process according to the invention provides the vertical centering and the vertical dimensioning by modifying the amplitude of the curve 40 in accordance with a formula as shall be described below. The diagram of FIG. 4 illustrates the main steps of the invention, which includes the following:

(a) measuring $T1_{HAV}$ and $T2_{HAV}$ to calculate the adjustment HPOS to perform in order to obtain the horizontal centering of the image (box 50);

(b) measuring $T1_{HAV}$ and $T2_{HAV}$ to calculate the adjustment to perform HSIZE in order to obtain the horizontal dimensioning of the image (box 52);

(c) measuring $T1_{VAV}$ and $T2_{VAV}$ to calculate the adjustment to perform VPOS and VSIZE in order to obtain at the same time vertical centering and the vertical dimensioning of the image (box 54); and (d) recording the values HPOS, HSIZE, VPOS' and VSIZE' in a memory (box 56) of the display calculator.

If an error arises during one of the steps 50, 52 and 54, notably in the case of image instability, the starting values are restored in the memory (box 58). These errors can arise from an image which is unstable, which is shifting, which is too small to be adjusted, or for any other reason.

Note that steps (a), (b) and (c) can be performed in any order, but it appears logical to start with the simplest, which is the horizontal centering step, due to the fact that it stems directly from the measurement of $T1_{HAV}$ and $T2_{HAV}$. Moreover, step (b) yields more precise results if it follows from step (a).

Figure 5A:
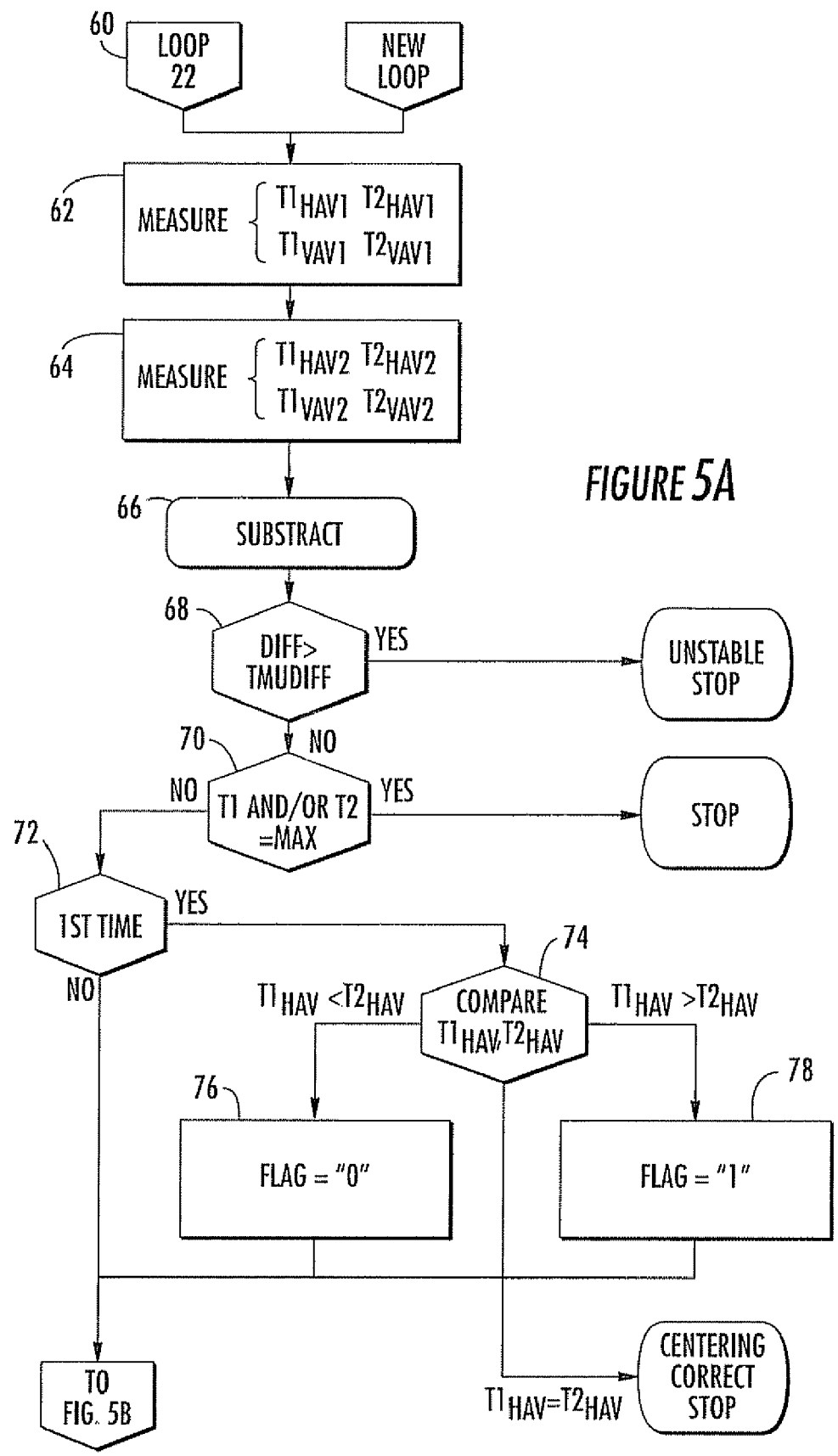
FIGS. 5A and 5B show the steps in the horizontal image centering algorithm in accordance with the process of the present invention, with this algorithm being preceded by an algorithm for checking the image stability.
Figure 5B:
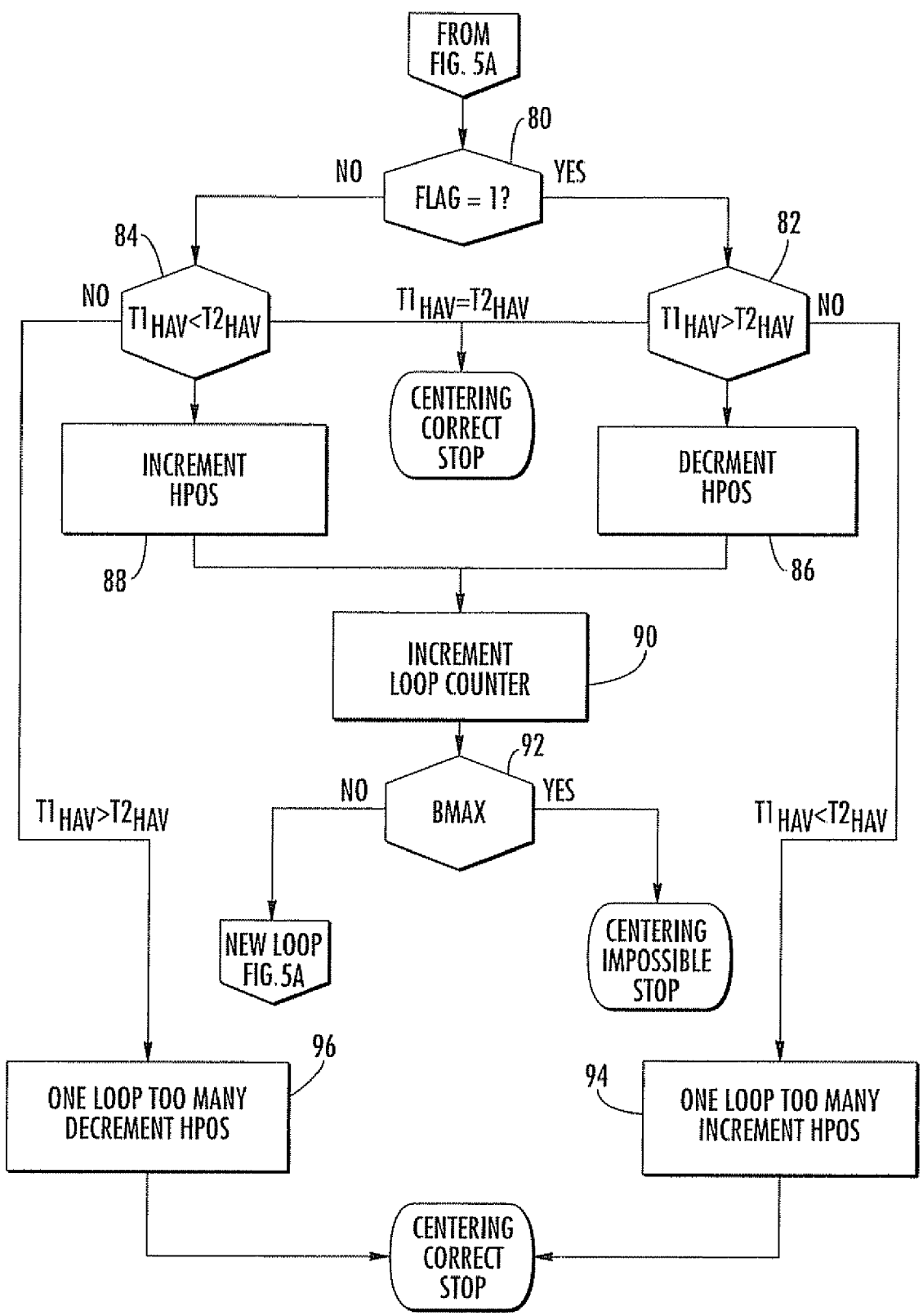

The diagrams of FIGS. 5A and 5B show in detail the operations to be performed during step (a) for horizontal centering. However, the first operations 60, 62, 64, 66, 68 and 70 are repeated, wholly or in part, at the start of each step (a), (b) or (c) to check that the image is stable within the established limits.

These first operations comprise the following steps: pressing on button 22 (arrow 60) to trigger the operations; performing a first series of measurements to obtain a first set of pairs of values $T1_{HAV1}$ and $T2_{HAV1}$, $T1_{VAV1}$ and $T2_{VAV1}$ (box 62); performing a second series of measurements to obtain a second set of pairs of values $T1_{HAV2}$ and $T2_{HAV2}$, $T1_{VAV2}$ and $T2_{VAV2}$ (box 64); subtracting the second set of pairs of values from the values from the first set (box 66) to obtain difference values DIFF in terms of absolute values; comparing the difference values DIFF with a threshold TMUDIFF (box 68); and stopping the operations if DIFF>TMUDIFF, for the image is then considered to be unstable or shifting, or passing onto the next operation (box 70) in the opposite case.

Note that the series of measurements $T1_{HAV}$ and $T2_{HAV}$ which concern the horizontal deflection are preferably only performed just before each horizontal adjustment (a) or (b) to determine the horizontal stability of the image. Likewise, the series of measurements $T1_{VAV}$ and $T2_{VAV}$, which concern the vertical deflection, are only performed just before the vertical adjustments, preferably for centering and dimensioning to determine the vertical image stability.

The first operation further includes comparing $T1_{HAV}$ and/or $T2_{HAV}$ (box 70) with a maximum value MAX and stopping the operations if it is reached, for the image is then considered to be too small and hence not exploitable, or that the video signal is bad (box 70). In the case of a negative comparison, the operation passes on to the next operation.

The first next operation concerns the horizontal centering, which comprises the following steps: checking whether the negative comparison arrives for the first time or not (box 72); and in the case of a positive check, passing on to the next operation comprising the steps of comparing $T1_{HAV}$ with $T2_{HAV}$ (box 74) and stopping the horizontal centering operations in the case of an inequality, for the image is already horizontally centered, and passing on to step (b); the image must be displaced to the right if $T1_{HAV} < T2_{HAV}$, with such an event being stored by a flag at the 0 state; the image must be displaced to the left if $T1_{HAV} > T2_{HAV}$, with such an event being stored by the flag, but in this case at the 1 state; and in the case of a negative check, or in the case where the image must be displaced, passing on to the next operation.

The value 0 or 1 for the flag indicates the direction in which the image is to be displaced. The displacement is in a stepwise manner by incrementing or decrementing the centering adjustment value HPOS. The following operations involve comparing $T1_{HAV}$ with $T2_{HAV}$ and modifying the centering adjustment value HPOS in the direction indicated by the value of the flag until detection of the equality $T1_{HAV} = T2_{HAV}$. These operations are presented in the diagram of FIG. 5B.

The first operation (box 80) includes checking whether the flag is at a logic 1, indicating that the image is off-centered in the right direction and must be brought back to the left. If the check is positive, the following operation includes checking whether $T1_{HAV} > T2_{HAV}$ (box 82), and there are three possible responses:

(i) $T1_{HAV} = T2_{HAV}$, in which case the image is centered and the horizontal centering operations are stopped to pass on to step (b);

(ii) $T1_{HAV} > T2_{HAV}$, in which case the image is off-centered in the right direction and must be displaced to the left by decrementing the adjustment value HPOS by one unit (box 86), and moreover, a loop counter 90 is incremented by one unit; and (iii) $T1_{HAV} < T2_{HAV}$, in which case the image which was off-centered in the right direction since the start of the operations is now off-centered towards the left, which means that the centering value HPOS has been exceeded by one unit. This overshoot is corrected by incrementing the horizontal adjustment value HPOS by one unit (box 94). With this incrementation, the value of HPOS corresponds to the center position, and the horizontal centering operations are stopped to pass on to step (b).

If the flag is not at a logic 1, i.e., the image is off-centered to the left and must be brought back to the right, the following operation (box 84) includes checking whether $T1_{HAV} < T2_{HAV}$, and there are three possible results as in the previous case:

(i) $T1_{HAV} = T2_{HAV}$, in which case the image is centered and the horizontal centering operations are stopped to pass on to step (b);

(ii) $T1_{HAV} < T2_{HAV}$, in which case the image is off-centered in the left direction and must be displaced to the right by incrementing the adjustment value HPOS by one unit (box 88), and moreover, a loop counter 90 is incremented by one unit; and (iii) $T1_{HAV} > T2_{HAV}$, in which case the image which was off-centered in the left direction since the start of the operations is now off-centered towards the right, which means that the centering value HPOS has been exceeded by one unit. This overshoot is corrected by decrementing the horizontal adjustment value HPOS by one unit (box 96). With this incrementation, the value of HPOS corresponds to the center position and the horizontal centering operations are stopped to pass on to step (b).

If the loop counter 90 is incremented, this means that the centering value HPOS has not yet been obtained and that it is necessary to start again all the operations described above (new loop) starting from step 62 that includes measuring new values of $T1_{HAV}$ and $T2_{HAV}$ subsequent to the new value of HPOS.

However, this new loop is performed only if the number of loops has not exceeded a certain threshold BMAX. The operation includes comparing (box 92) the contents of the loop counter 90 with BMAX, stopping the operations if the centering has not been achieved after a set number of shifts BMAX, or starting a new loop if BMAX is not attained.

To set the horizontal dimension of the image such that it takes up the entire width of the screen, i.e., without vertical black edges, it is necessary to change the amplitude setting for the current flowing in the horizontal deflection coil. Such an adjustment is represented by a value HSIZE which can vary, e.g., between 0 and 255. It is this value HSIZE for obtaining a maximum image width which is calculated by the method according to the invention. This value is dependent on many parameters, and notably $T1_{HAV}$ and $T2_{HAV}$. The formula which enables calculation of HSIZE is:

$$HSIZE = \frac{A_{Vopti}(T'/Td') - H_{AMPMIN}}{H_{AMPMAX} - H_{AMPMIN}} \times HSIZE_{MAX}$$

The variables in the formula are defined as follows:
- $A_{Vopti}$ is the optimum amplitude of the current in the horizontal deflection coil to obtain an image of optimum width. This amplitude is measured for a type of cathode ray tube and in a reference video mode;
- $HSIZE_{MAX}$ is the maximum value of HSIZE, e.g., 255 as indicated above,
- $H_{AMPMAX}$ is the maximum variation of the current in the horizontal deflection coil to obtain a maximum horizontal deflection. This value varies as a function of the horizontal scanning frequency f(fH) as described below;
- $H_{AMPMIN}$ is the minimum variation of the current in the horizontal deflection coil to obtain a minimum horizontal deflection. This value varies as a function of the horizontal scanning frequency f (fH) as described below;
- T' is the total duration of a horizontal line, i.e., the duration of the period T of the horizontal synchronization signal, from which are subtracted the duration of the flyback pulse $T_{FLYBACK}$, in general three microseconds, and a duration of safety margins of 0.6 microseconds, for example; and

- $Td' = T - (T1_{HAV} + T2_{HAV} + T_{FLYBACK})$, that is, the duration of the image on the screen between these black edges.

This formula is established by supposing that the current varies linearly, which is not the case. To take into account the fact that the curve is S shaped, the coefficient applied $A_{Vopti}$ must be replaced by $(1.8T' - Td')/2.8Td'$.

This coefficient can change depending on the type of cathode ray tube and its control device.

Figure 6:
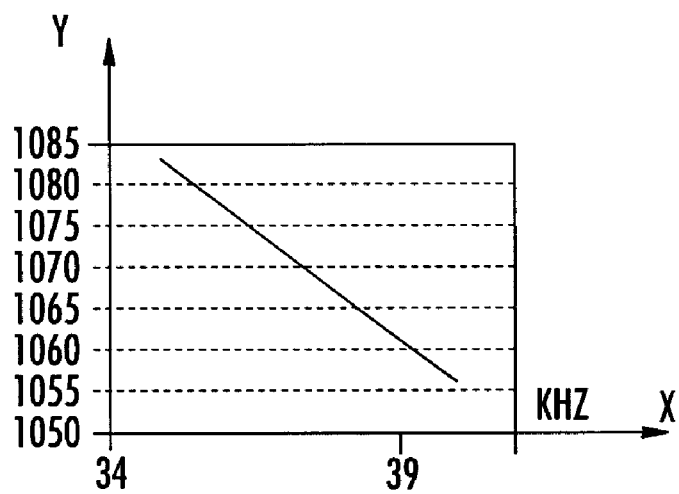
FIG. 6 is a curve showing the variation of $H_{AMPMIN}$ as a function of the horizontal scanning frequency for a given range of frequencies in accordance with the present invention.

The values for $H_{AMPMIN}$ and $H_{AMPMAX}$ are determined using curves as a function of the horizontal scanning frequency f(H), this being effected for frequency ranges. For instance, curve 100 of FIG. 6 shows the function of $H_{AMPMIN} = f(fH)$ for a range of frequencies from 34kHz to 41kHz for the case of a given cathode ray tube. The abscissa x is graduated in kHz while the ordinate is graduated in $H_{AMP}$ x 10mA. There is thus obtained a straight line whose equation is:

$Y = -5.22x + 1265.1 = ax + b$

This equation is different for another range of frequencies. Coefficients a and b determined for each range of frequencies are recorded in a memory so that they can be read in view of calculating $H_{AMPMIN}$ according to the horizontal scanning frequency.

$H_{AMPMAX}$ is obtained in the same manner as for $H_{AMPMIN}$. As a result, if there are eight frequency ranges, there shall be sixteen pairs of coefficients (a, b) which define the sixteen variation curves, eight for $H_{AMPMIN}$ and eight for $H_{AMPMAX}$.

To achieve vertical centering and vertical dimensioning, the method according to the invention includes measuring the values $T1_{VAV}$ and $T2_{VAV}$ for the image which appears on the screen, and then first calculating VSIZE to obtain the vertical dimensioning and subsequently VPOS' to obtain the vertical centering according to the following formula:

$$\text{VSIZE'} = 0.5[(3\text{VSIZEMAX}+2\text{VSIZE})].[(\text{Td} \times \text{T'})/(\text{Td'} \times \text{T})]-1.5(\text{VSIZEMAX}), \text{ and}$$

$$\text{VPOS'} = \text{VPOS} + (A - B) \text{ with } A = [(2.25+1.5.(\text{VSIZE}/\text{VSIZEMAX})] \times [(0.5-\text{T1}/\text{T}).(\text{VPOSMAX}/0.6)], \text{ and}$$

$$B = [(2.25+1.5.(\text{VSIZE'}/\text{VSIZEMAX})] \times [0.5-\text{T1'}/\text{T'}).(\text{VPOSMAX}/0.6)]$$

Figure 7:
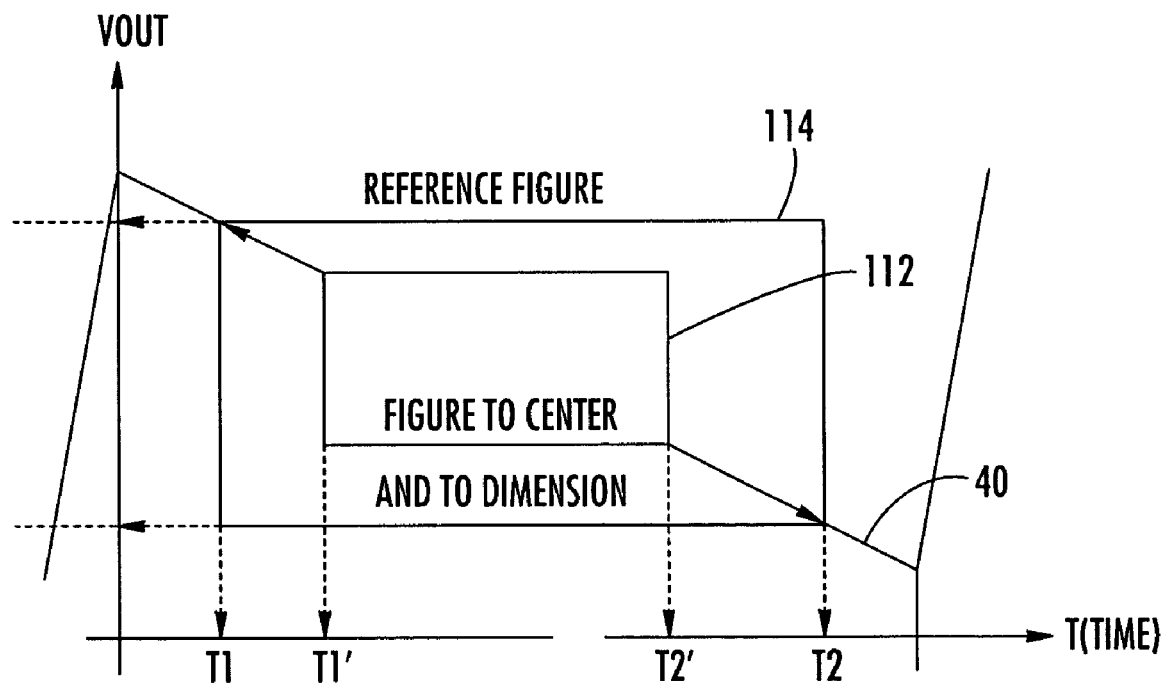
FIG. 7 is a diagram showing the adjustment for vertical centering and vertical dimensioning in accordance with the present invention.
Figure 1A:
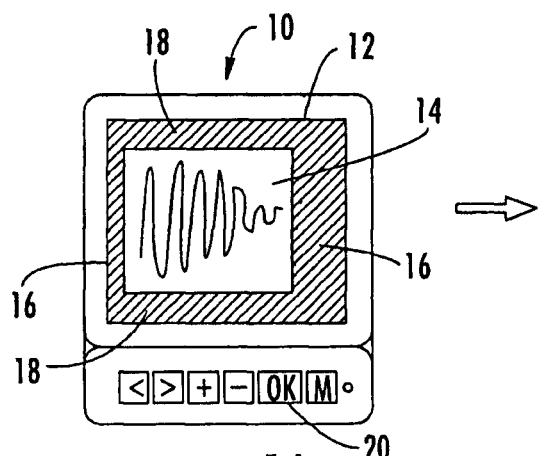
Figure 1B:
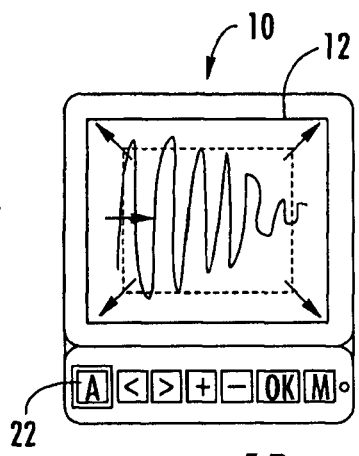
Figure 2:
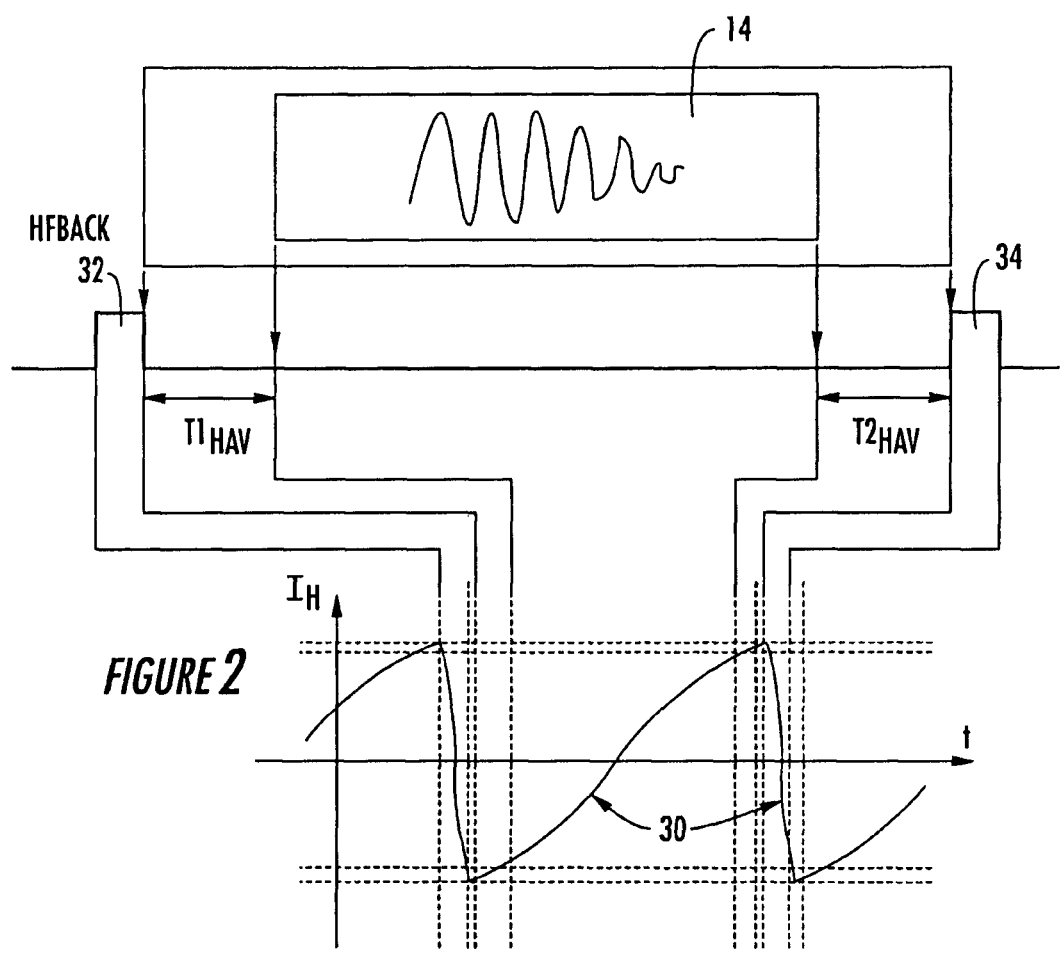
Figure 3:
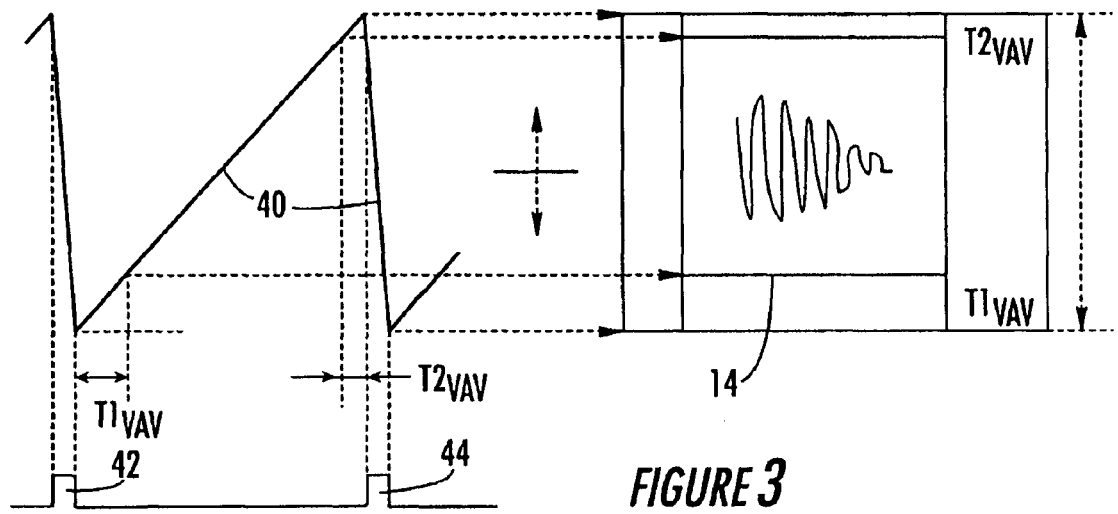
Figure 4:
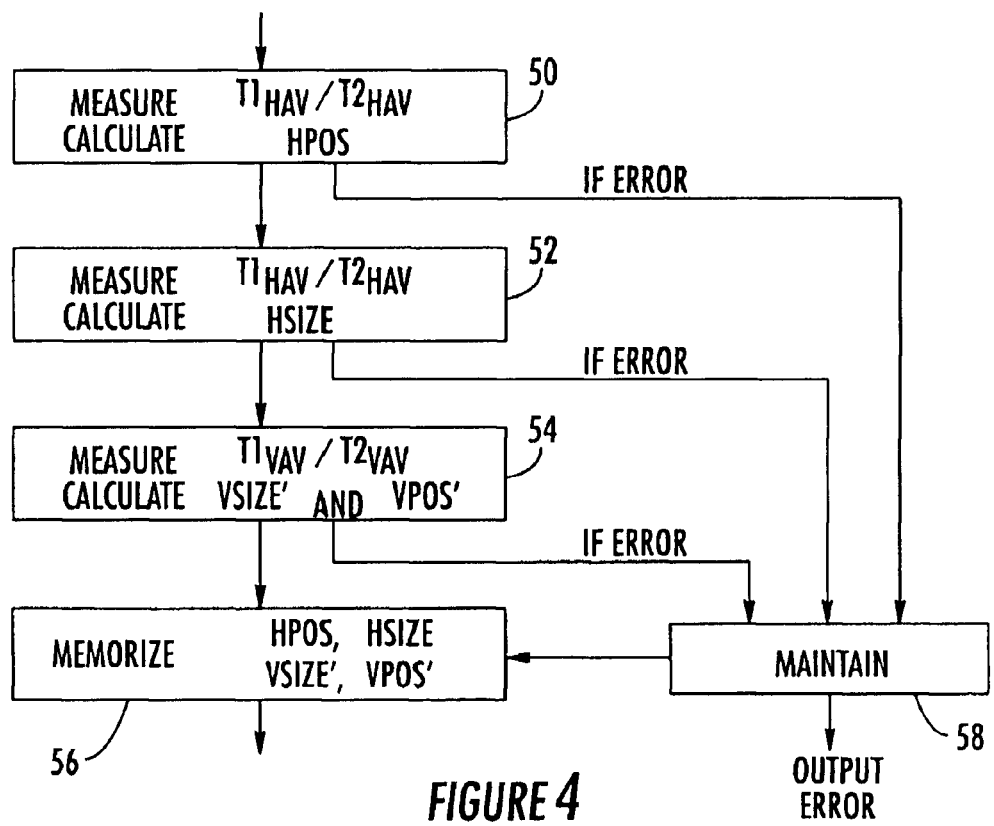
Figure 5A:
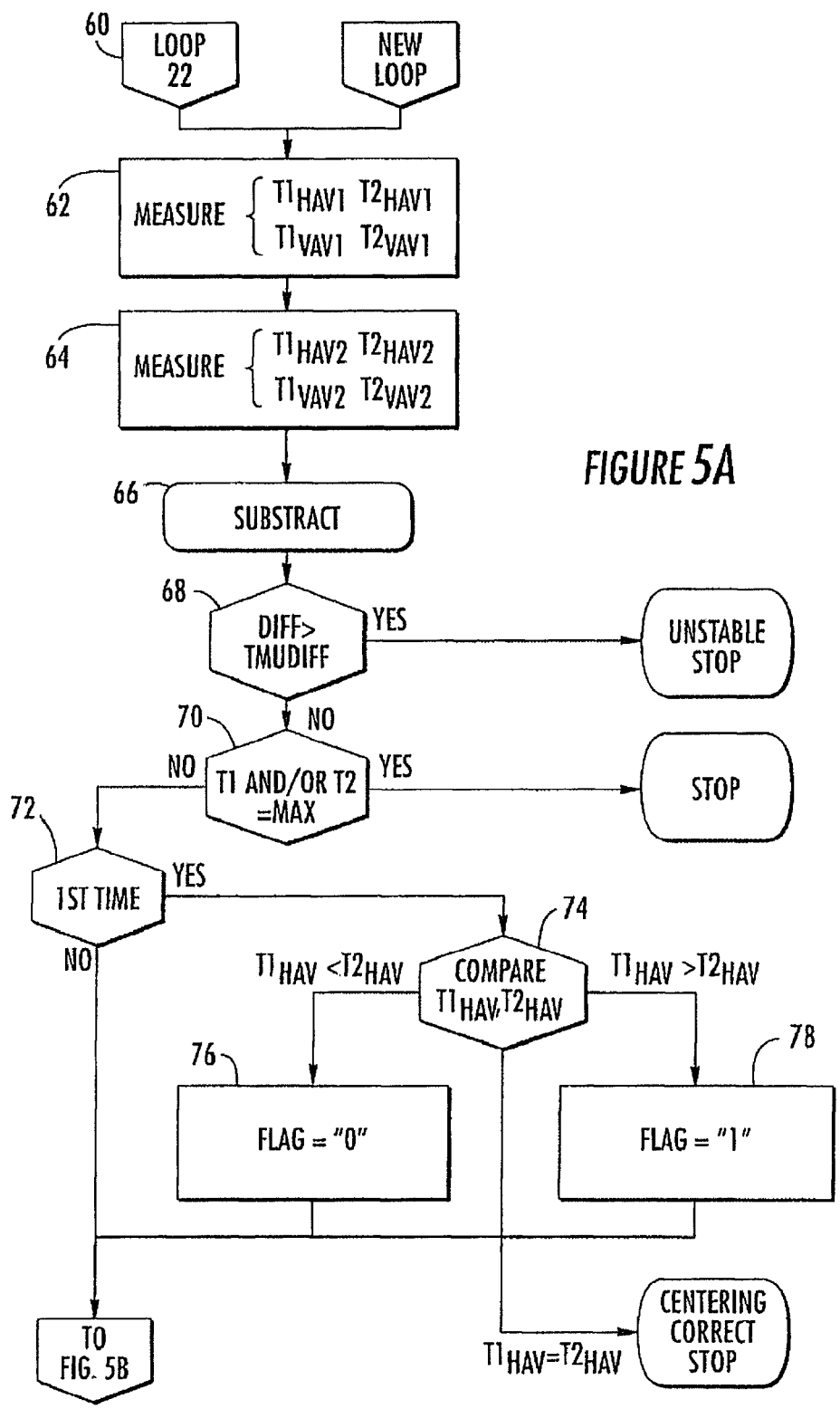
Figure 5B:
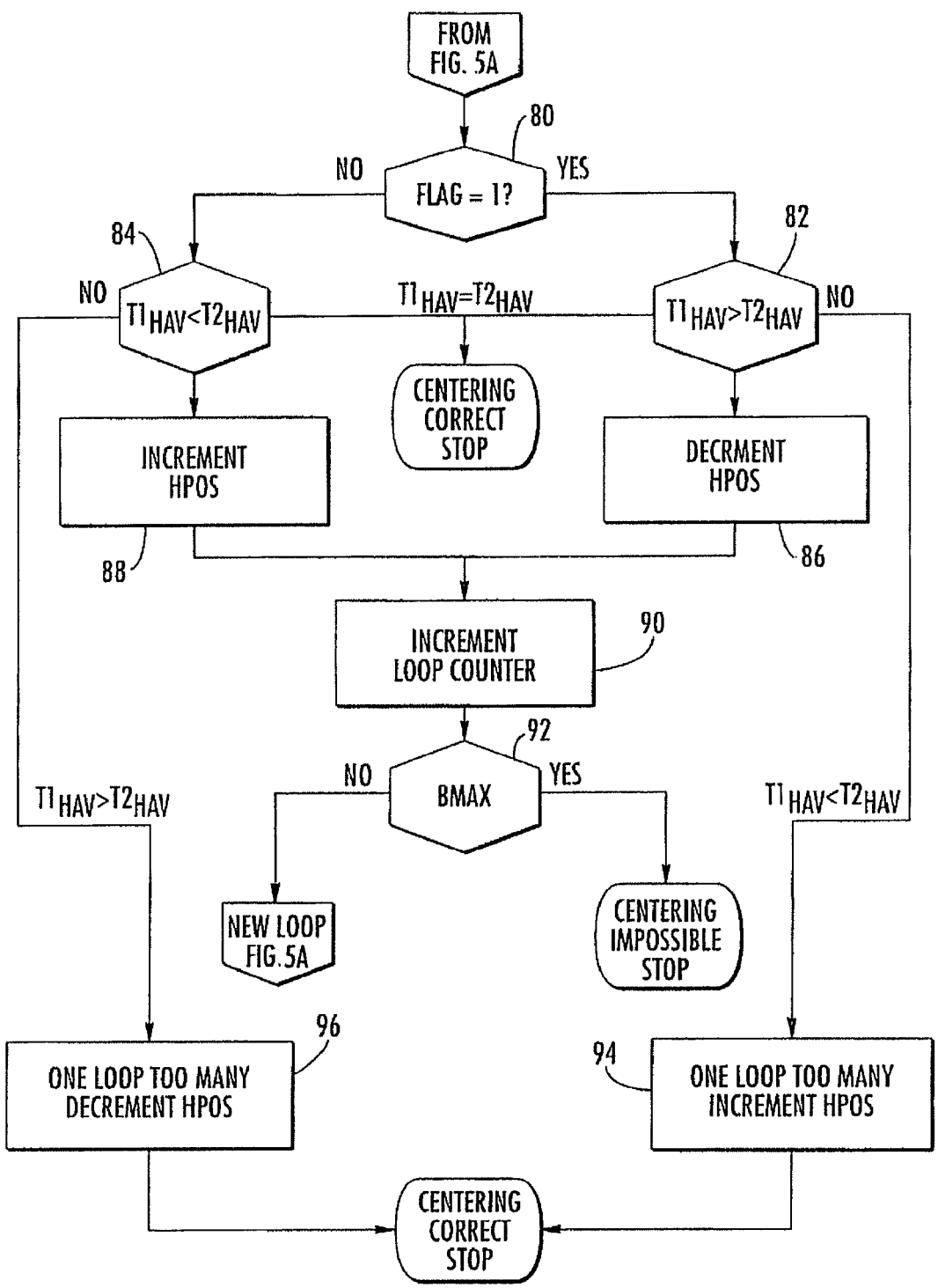
Figure 6:
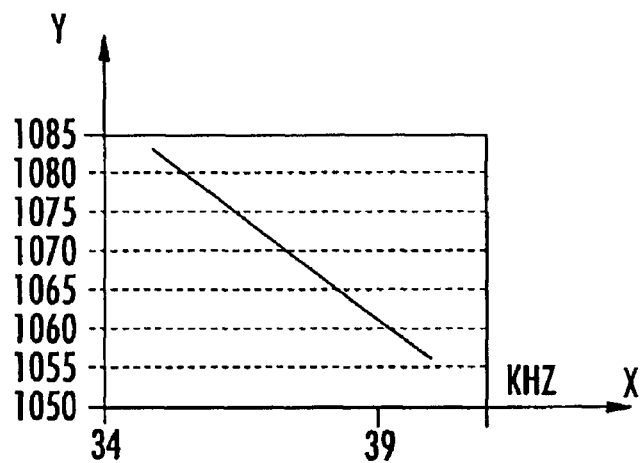
Figure 7:
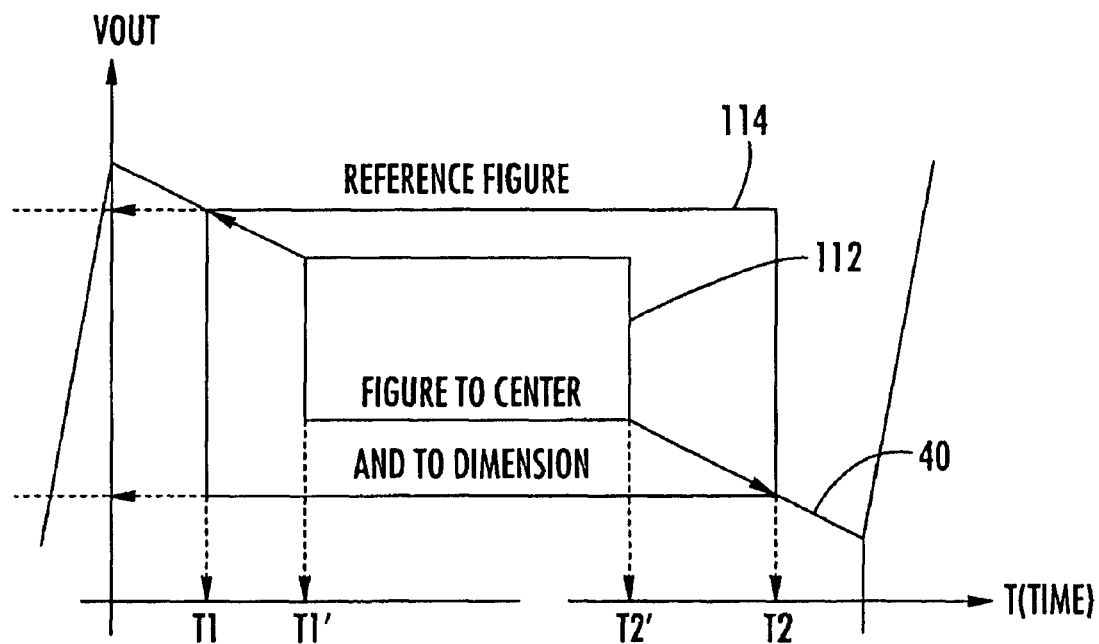
Figure 3:
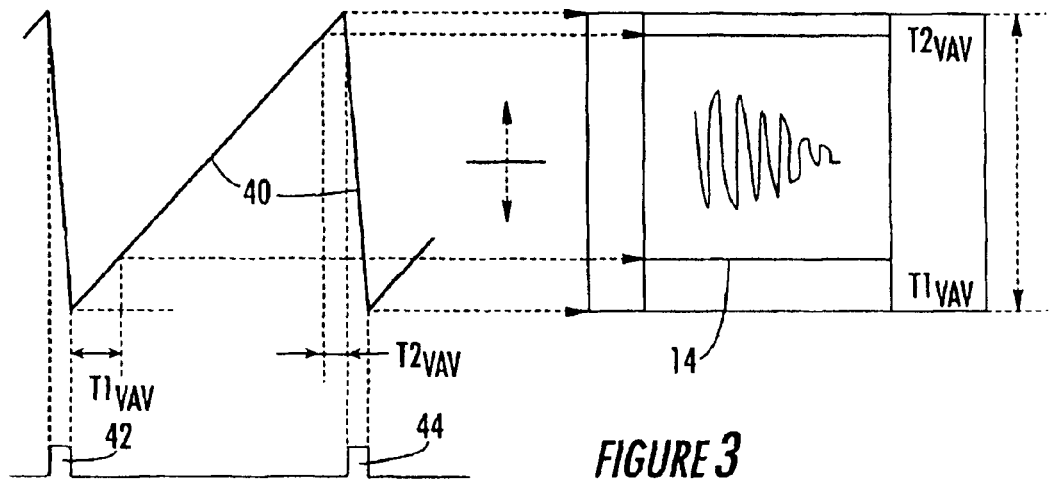
Figure 4:
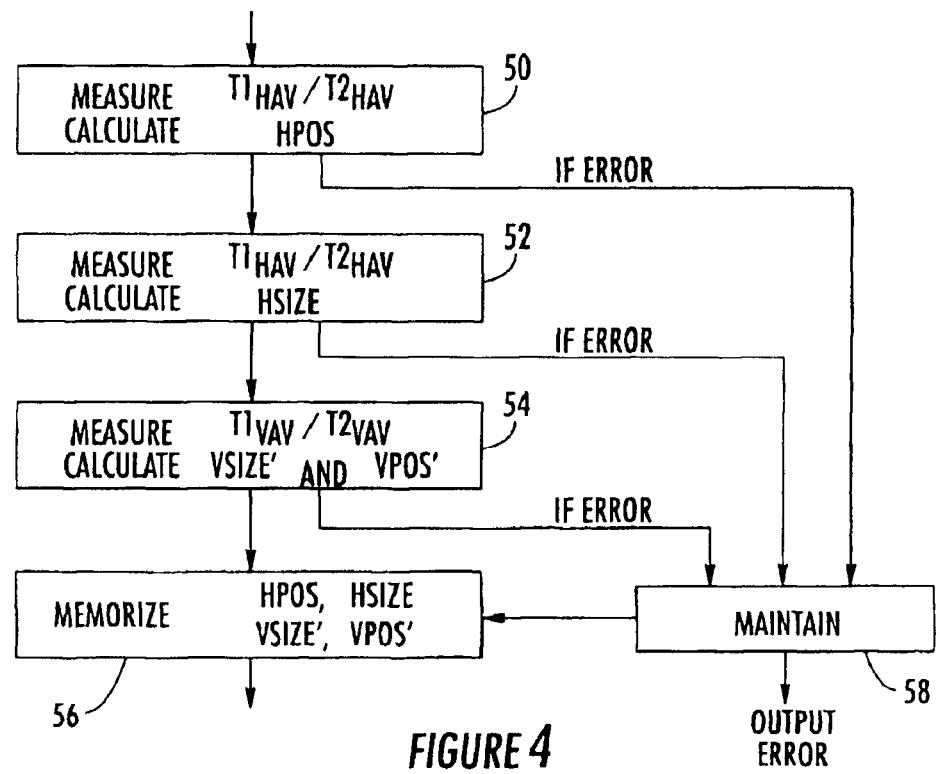
Figure 5A:
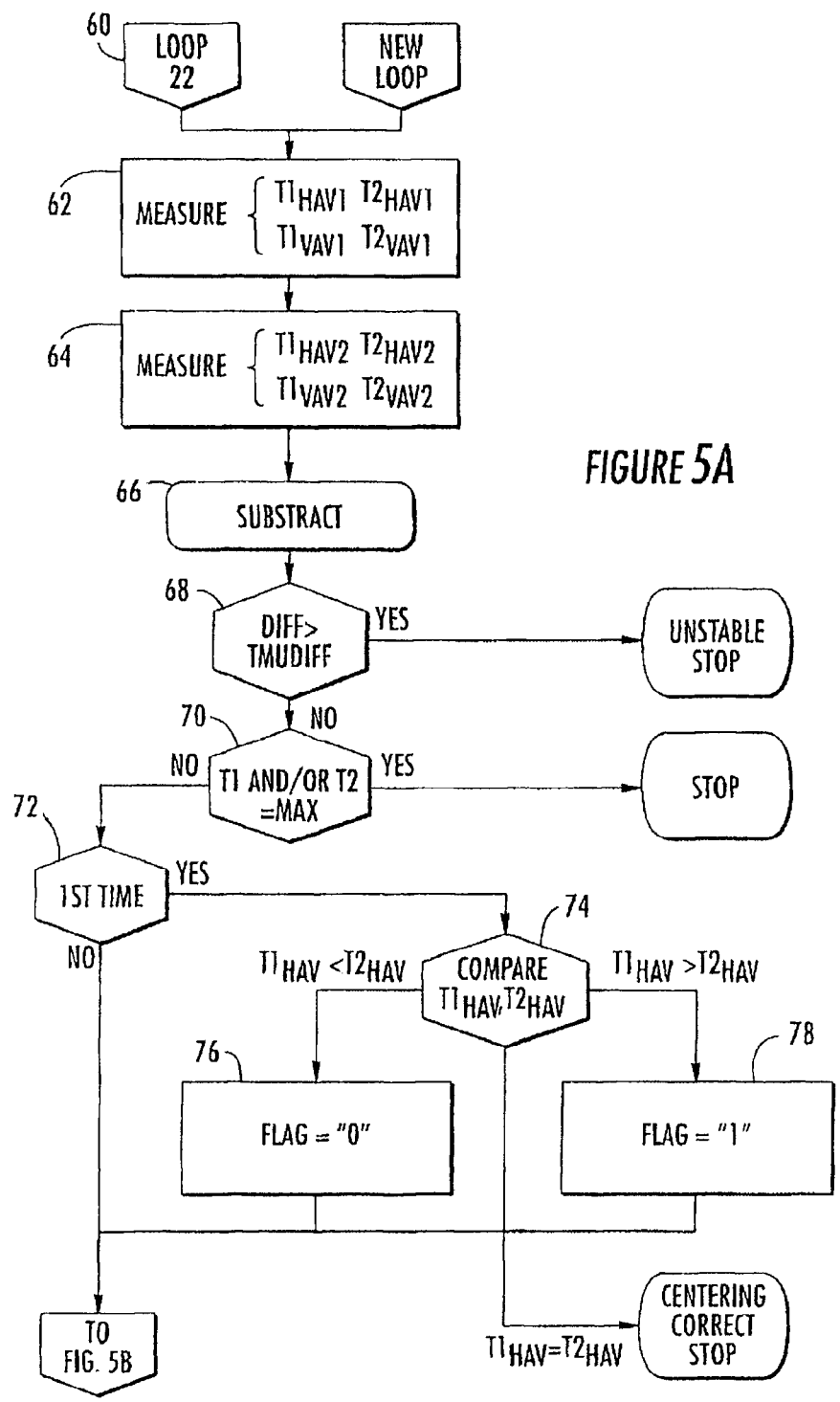
Figure 5B:
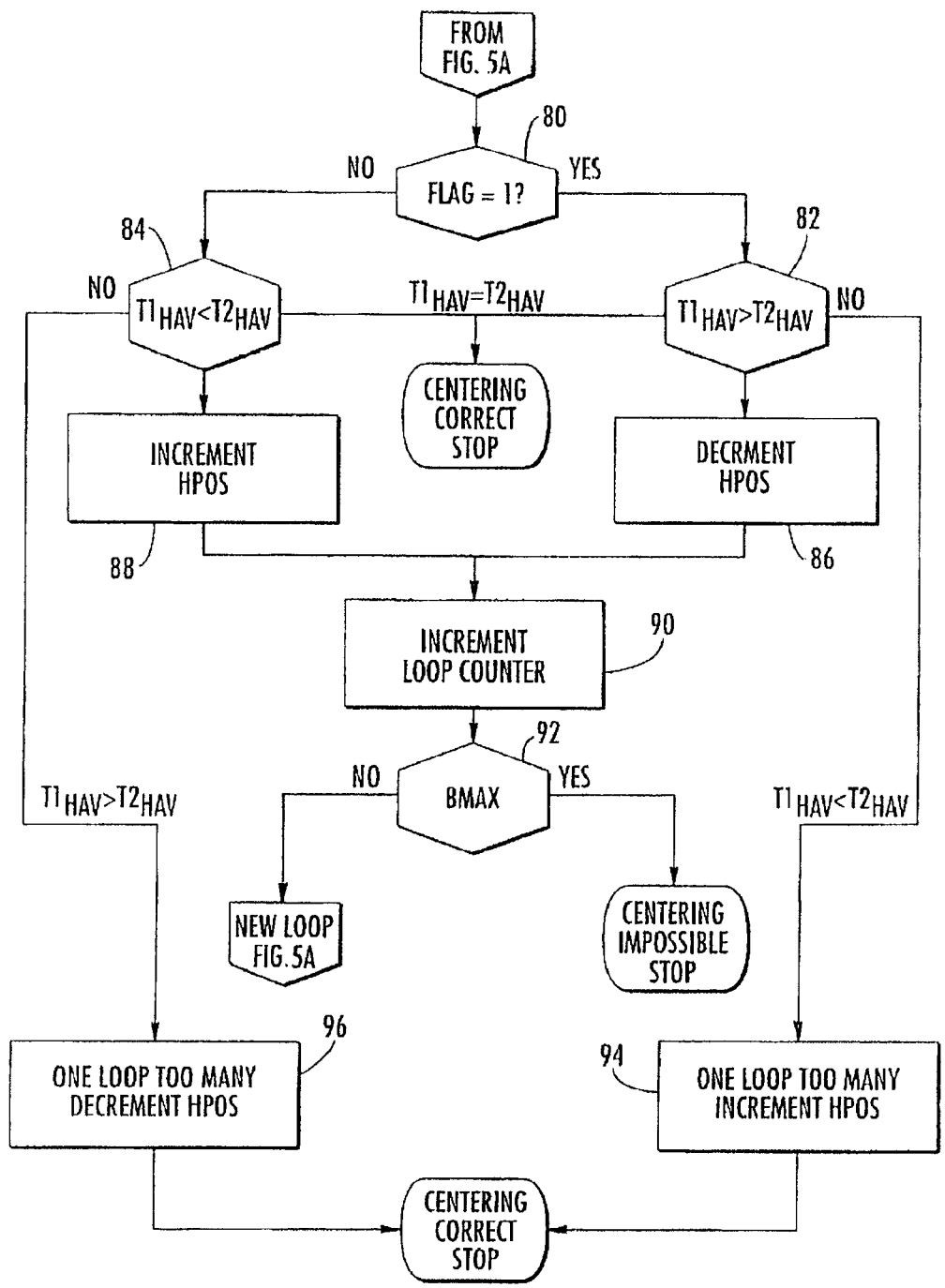
Figure 6:
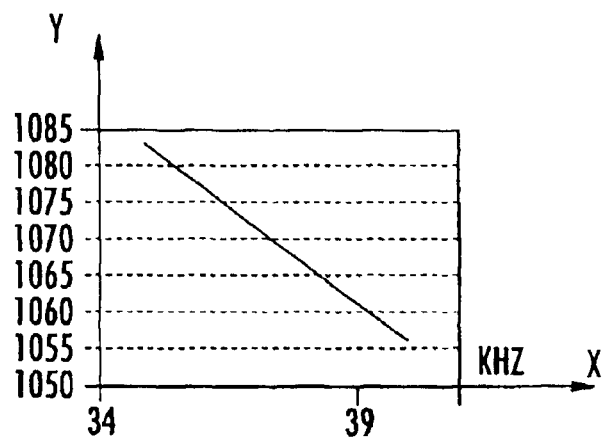
Figure 7:
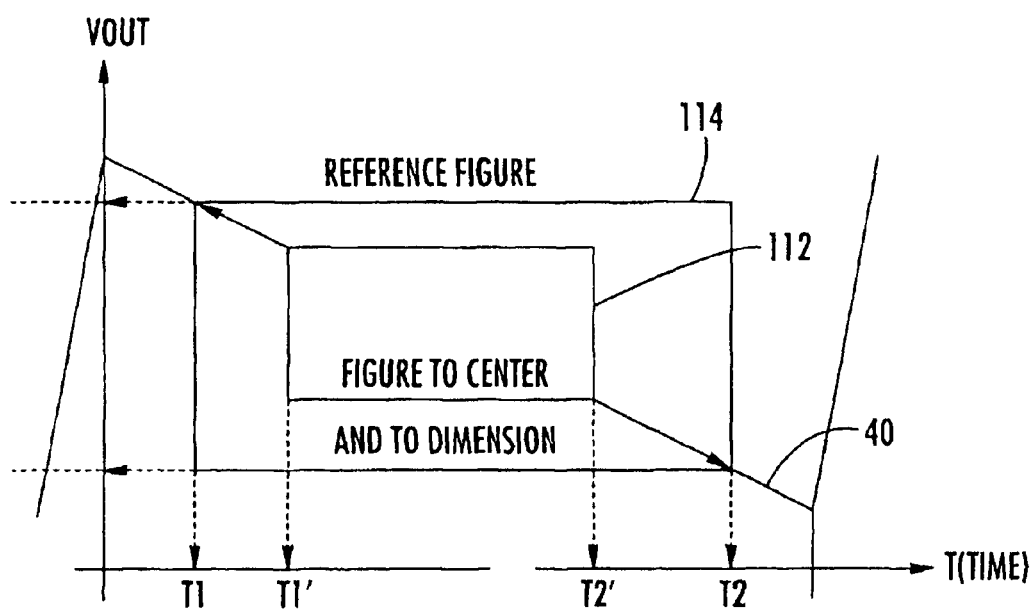

To define the parameters of these formulas, reference shall be made to FIG. 7, which shows the sawtooth for vertical scanning 40, but inversed with respect to that of FIG. 3. The abscissa shows the duration and the ordinate shows the voltage $V_{OUT}$. On this sawtooth is placed the image 112 to be vertically centered and dimensioned and a reference image which is appropriately vertically centered and dimensioned.

In FIG. 7, $T_1$ and $T_2$ correspond in time periods respectively to the start and end of the reference image 114, while T1' and T2' correspond in time periods respectively to the start and end of the image 112 to be centered and dimensioned. The following relations are then established. The duration Td of the reference image is given by Td = T2-T1, and the duration Td' of the image to be centered is given by Td' = T2'-T1'. Also, T1 = T1$_{VAV}$ and T2 = T – T2$_{VAV}$, with T being the total duration of a sawtooth. Similarly, T1' = T1'$_{VAV}$ and T2' = T' – T2'$_{VAV}$.

The reference image 114 is obtained by a manual adjustment in a reference video mode on a given type of cathode ray tube, and the values T1$_{VAV}$ and T2$_{VAV}$ are measured and entered into a memory to be used for the automatic adjustments on that type of cathode ray tube. The same applies for the value VSIZE, which corresponds to that reference image, while VZIZEMAX is the maximum adjustment value, for example, 256.

These elements allow calculation of the value VSIZE' according to the above formula, i.e., the adjustment value that will allow one to obtain an image which is appropriately vertically dimensioned. By knowing VSIZE', it is possible to calculate VPOS' according to the above formula, which also uses the value VPOSMAX, which is the maximum adjustment for the vertical centering.

The invention has been described in its application to the adjustment of a cathode ray tube by the user of a computer or a television set in which the cathode ray tube forms the display screen. The invention also applies to the implementation of the process for adjusting the horizontal and vertical deflection coils at the end of a cathode ray tube production line.

Indeed, at the end of a cathode ray tube production line, the image generated to test for the correct operation of the cathode ray tube exhibits faults which an operator corrects in various ways. One of the faults concerns a bad alignment between the image and screen centers and, to correct it, the operator first performs image centering and dimensioning adjustments using the buttons 20 (FIG. 1A). This is done to make adjustments in the electronic and magnetic circuits (deflection coils) to displace the image center and make it coincide with the center of the screen. In this sequence of operations, the method of the invention can be implemented to obtain the centering HPOS and HPOS', and possibly the dimensioning HSIZE and VSIZE'.

For this adjustment, the operations to be performed would then be as follows: display a calibrated image such as, for example, a white image with a perfectly centered cross; launch the process of the invention wholly or in part; and modify the electronic and magnetic settings for the screen to bring the cross to the center of the screen.

CERTIFICATE OF CORRECTION (continued)
U.S. Pat. No. 7,215,378 B2

The claims should read as follows:

The invention claimed is:

1. A display comprising
a cathode ray tube for displaying an image thereon; and
a calculation circuit connected to said cathode ray tube for centering and dimensioning the image being displayed by
 (a) measuring durations of vertical border edges of the image and iteratively modifying adjustment values for a horizontal centering of the image to obtain equal lateral vertical edges,
 (b) measuring the durations of the vertical border edges of the image to calculate adjustment values for a horizontal dimension of the image to cause the vertical border edges to disappear, and
 (c) measuring durations of horizontal border edges of the image to calculate adjustment values of a vertical dimension of the image, and to calculate adjustment values of a vertical centering of the image to cause the horizontal border edges to disappear and to center the image vertically;
said calculation circuit further checking stability of the image at a start of at least one of the steps (a), (b) and (c), by
 ($a_0$) measuring a pair of durations of at least one of the vertical and horizontal border edges of the image,
 ($a_1$) subtracting two successive measurements to determine a variation in the durations,
 ($a_2$) comparing the variation with a first threshold, and stopping if the first threshold is exceeded or continuing if the first threshold is not exceeded, and
 ($a_3$) comparing the measurements with a second threshold, and stopping if the second threshold is exceeded or continuing with at least one of steps (a), (b) and (c) if the second threshold is not exceeded.

2. A display according to claim 1, further comprising a display calculator connected to said cathode ray tube for providing display signals thereto.

3. A display according to claim 2, wherein said display calculator comprises a memory for recording the adjustment values obtained.

4. A display according to claim 1, wherein the durations of the vertical border edges of the image are indicated by variables $T1_{HAv}$ and $T2_{HAV}$; and wherein said calculation circuit further comprises performing:
 ($a_4$) checking that the measurements of the durations $T1_{HAV}$ and $T2_{HAV}$ are a first measurement since a start of steps (a), (b) or (C), and if a response of the checking is negative, then passing on to a sub-step ($a_6$), and if the response of the checking is positive, then passing on to a substep ($a_5$); and
 ($a_5$) comparing the measurements for $T1_{HAV}$ and $T2_{HAV}$.

5. A display according to claim 4, wherein step ($a_4$) further comprises:
setting a flag to a first logic value if $T1_{HAV} < T2_{HAV}$ to indicate that the image is to be displaced towards the right;
setting the flag to a second logic value if $T1_{HAV} < T2_{1HAV}$ to indicate that the image is to be displaced towards the left; and
stopping the horizontal centering if $T1_{HAV} = T2_{HAV}$, since the image is centered horizontally, and passing on to step (b).

6. A display according to claim 5, wherein said calculation circuit further comprises performing:
 ($a_6$) checking whether the flag is at the second logic value, and if the checking is a positive response, then passing on to a next sub-step ($a_7$), and if the checking is a negative response, then passing on to a sub-step ($a_8$);

($a_7$) checking whether $T1_{HAV} < T2_{HAV}$, and if $T1_{HAV}=T2_{HAV}$ since the image is horizontally centered, then stopping, and if the checking is a positive response, then passing on to a sub-step ($a_9$), and if the checking is a negative response, then passing on to a sub-step ($a_{10}$); and ($a_8$) checking whether $T1_{HAV} < T2_{HAV}$, and if $T1_{HAV}=T2_{HAV}$, since the image is horizontally centered, then passing on to step (b), and if the checking is a positive response, then passing on to a sub-step ($a_{11}$), and if the checking is a negative response, then passing on to a sub-step ($a_{12}$).

7. A display according to claim 6, wherein said calculation circuit further comprises performing:

($a_9$) decrementing by one unit the adjustment value for centering the image to displace the image by one incremental step to the left, and passing on to a sub-step ($a_{13}$);

($a_{10}$) incrementing by one unit the adjustment value for centering the image to displace the image towards the right, since the image had been displaced by one incremental step too far towards the left, and stopping the horizontal centering since the image is centered horizontally and passing on to step (b);

($a_{11}$) incrementing by one unit the adjustment value for centering the image to displace the image by one incremental step to the right, and passing on to sub-step ($a_{13}$);

($a_{12}$) decrementing by one unit the adjustment value for centering the image to displace the image towards the left, since the image had been displaced by one incremental step too far towards the right, and stopping the horizontal centering since the image is centered horizontally and passing on to step (b);

($a_{13}$) incrementing a loop counter by one unit each time the sub-step ($a_9$) or ($a_{11}$) has been performed, then passing on to a following sub-step ($a_{14}$); and ($a_{14}$) checking whether content of the loop counter has attained a third threshold, and if the checking is a positive answer, then stopping on account of an impossibility of adjustment, and if the checking is a negative answer, then restarting the loop at step ($a_2$).

8. A display according to claim 1, wherein the durations of the vertical border edges of the image are indicated by variables $T_{HAV}$ and $T2_{HAV}$; and wherein calculating the adjustment of the horizontal dimension of the image in step (b) is based upon the formula:

$$HSIZE = \frac{A_{Vopti}(T'/Td') - H_{AMPMIN}}{H_{AMPMAX} - H_{AMPMIN}} \times HSIZE_{MAX}$$

wherein:

$A_{vopti}$ is an optimum amplitude of a current in a horizontal deflection coil of the cathode ray tube to obtain an image of optimum width, with the amplitude being measured for a type of cathode ray tube, $HSIZE_{MAX}$ is a maximum value of the adjustment of the horizontal dimension of the image, $H_{AMPMAX}$ is a maximum variation of a current in the horizontal deflection coil to obtain a maximum horizontal deflection, this value varies as a function of a horizontal scanning frequency;

$H_{AMPMIN}$ is a minimum variation of the current in the horizontal deflection coil to obtain a minimum horizontal deflection, this value varies as a function of the horizontal scanning frequency;

T' is a total duration of a period T of a horizontal synchronization signal, from which are subtracted a duration of a flyback pulse TFLYBACK and a duration of safety margins, and $Td'=T-(T1_{HAV}+T2_{HAV}+T_{FLYBACK})$, which is a duration of the image on the screen between the border edges.

9. A display according to claim 8, wherein the coefficient (T'/Td') in the formula is replaced by 1.8T'−Td'/2.8Td' to take into account a form of a curve for the current in the horizontal deflection coil.

10. A display according to claim 1, wherein the durations of the horizontal border edges of the image are indicated by variables $T1_{VAV}$ and $T2_{VAV}$; and wherein calculating the adjustment of the vertical dimension of the image in step (c) is based upon the formula:

$$VSIZE' = 0.5[(3VSIZEMAX + 2VSIZE)] \cdot [(Td \times T')/(Td' \times T)]1.5 \; (VSIZEMAX);$$

and wherein calculating the adjustment of the vertical centering of the image in step (c) is based upon the formula:

$$VPOS' = VPOS + (A-B), \text{ with } A = [(2.25 + 1.5 \cdot (VSIZE/VSIZEMAX)] \times [(0.5 - T1/T) \cdot (VPOSMAX/0.6)],$$
$$\text{and } B = [(2.25 \; 1.5 \cdot (VSIZE'/VSIZEMAX)] \times [0.5 - T1/T') \cdot (VPOSMAX/0.6)],$$

wherein:
    Td is a duration of a reference image such that:

$$Td = T2 - T1 \text{ with } T1 = T1_{VAV} \text{ and } T2 = T - T2_{VAV},$$

T is a total duration of a vertical scanning sawtooth,
    Td' is a duration of the image to dimension and to center such that:

$$Td' = T2' - T1' \text{ with } T1' = T1'_{VAV} \text{ and } T2' = T' - T2'_{VAV},$$

VSIZE is an adjustment value for the vertical dimension of the reference image,
    VSIZEMAX is a maximum adjustment value for the vertical dimension of the image,
    VPOS is an adjustment for the vertical centering of the reference image, and
    VPOSMAX is a maximum adjustment value for the vertical centering.

11. A display comprising
a cathode ray tube for displaying an image thereon; and
a calculation circuit connected to said cathode ray tube for horizontal centering and horizontal dimensioning the image being displayed on said screen by
  (a) measuring durations of vertical border edges of the image and iteratively modifying adjustment values for a horizontal centering of the image to obtain equal lateral vertical edges, and
  (b) measuring the durations of the vertical border edges of the image to calculate adjustment values for a horizontal dimension of the image to cause the vertical border edges to disappear
said calculation circuit further checking for stability of the image by
  ($a_0$) measuring a pair of durations of at least one of the vertical and horizontal border edges of the image,
  ($a_1$) subtracting two successive measurements to determine a variation in the durations,
  ($a_2$) comparing the variation with a first threshold, and stopping if the first threshold is exceeded or continuing if the first threshold is not exceeded, and
  ($a_3$) comparing the measurements with a second threshold, and stopping if the second threshold is exceeded or continuing with at least one of steps (a) and (b) if the second threshold is not exceeded.

12. A display according to claim 11, further comprising a display calculator connected to said cathode ray tube for providing display signals thereto.

13. A display according to claim 11, wherein the durations of the vertical border edges of the image are indicated by variables $T1_{HAV}$ and $T2_{HAV}$; and wherein said calculation circuit further comprises performing:

- ($a_4$) checking that the measurements of the durations $T1_{HAV}$ and $T2_{HAV}$ are a first measurement since a start of steps (a) or (b), and if a response of the checking is negative, then passing on to a sub-step ($a_6$), and if the response of the checking is positive, then passing on to a sub-step ($a_5$); and
- ($a_5$) comparing the measurements for $T1_{HAV}$ and $T2_{HAV}$.

14. A display according to claim 13, wherein step ($a_4$) further comprises:

setting a flag to a first logic value if $T1_{HAV} < T2_{HAV}$ to indicate that the image is to be displaced towards the right;

setting the flag to a second logic value if $T1_{HAV} < T2_{HAV}$ to indicate that the image is to be displaced towards the left; and stopping the horizontal centering if $T1_{HAV} = T2_{HAV}$, since the image is centered horizontally, and passing on to step (b).

15. A display according to claim 14, wherein said calculation circuit further comprises performing:

- ($a_6$) checking whether the flag is at the second logic value, and if the checking is a positive response, then passing on to a next sub-step ($a_7$), and if the checking is a negative response, then passing on to a substep ($a_8$);
- ($a_7$) checking whether $T1_{HAV} < T2_{HAV}$, and if $T1_{HAV} = T2_{HAV}$ since the image is horizontally centered, then stopping, and if the checking is a positive response, then passing on to a sub-step ($a_9$), and if the checking is a negative response, then passing on to a sub-step ($a_{10}$); and
- ($a_8$) checking whether $T1_{HAV} < T2_{HAV}$, and if $T1_{HAV} = T2_{HAV}$, since the image is horizontally centered, then passing on to step (b), and if the checking is a positive response, then passing on to a sub-step ($a_{11}$), and if the checking is a negative response, then passing on to a sub-step ($a_{12}$).

16. A display according to claim 15, wherein said calculation circuit further comprises performing:

- ($a_9$) decrementing by one unit the adjustment value for centering the image to displace the image by one incremental step to the left, and passing on to a sub-step ($a_{13}$);
- ($a_{10}$) incrementing by one unit the adjustment value for centering the image to displace the image towards the right, since the image had been displaced by one incremental step too far towards the left, and stopping the horizontal centering since the image is centered horizontally and passing on to step (b);
- ($a_{11}$) incrementing by one unit the adjustment value for centering the image to displace the image by one incremental step to the right, and passing on to sub-step ($a_{13}$);
- ($a_{12}$) decrementing by one unit the adjustment value for centering the image to displace the image towards the left, since the image had been displaced by one incremental step too far towards the right, and stopping the horizontal centering since the image is centered horizontally and passing on to step Cb);
- ($a_{13}$) incrementing a loop counter by one unit each time the sub-step ($a_9$) or ($a_{11}$) has been performed, then passing on to a following sub-step ($a_{14}$); and
- ($a_{14}$) checking whether content of the loop counter has attained a third threshold, and if the checking is a positive answer, then stopping on account of an impossibility of adjustment, and if the checking is a negative answer, then restarting the loop at step ($a_2$).

17. A display according to claim 11, wherein the durations of the vertical border edges of the image are indicated by variables $T1_{HAV}$ and $T2_{HAV}$; and wherein calculating the adjustment of the horizontal dimension of the image in step (b) is based upon the formula:

$$HSIZE = \frac{AV_{opti}(T'/Td') - H_{AMPMIN}}{H_{AMPMAX} - H_{AMPMIN}} \times HSIZE_{MAX}$$

wherein:

$A_{vpoti}$ is an optimum amplitude of a current in a horizontal deflection coil of the cathode ray tube to obtain an image of optimum width, with the amplitude being measured for a type of cathode ray tube, $HSIZE_{MAX}$ is a maximum value of the adjustment of the horizontal dimension of the image, $H_{AMPMAX}$ is a maximum variation of a current in the horizontal deflection coil to obtain a maximum horizontal deflection, this value varies as a function of a horizontal scanning frequency;

$H_{AMPMIN}$ is a minimum variation of the current in the horizontal deflection coil to obtain a minimum horizontal deflection, this value varies as a function of the horizontal scanning frequency;

T' is a total duration of a period T of a horizontal synchronization signal, from which are subtracted a duration of a flyback pulse $T_{FLYBACK}$ and a duration of safety margins, and Td'=T ($T1_{HAV}$+$T2_{HAV}$+$T_{FLYBACK}$), which is a duration of the image on the screen between the border edges.

18. A display according to claim 17, wherein the coefficient (T'/Td') in the formula is replaced by 1.8T'–Td'/2.8Td' to take into account a form of a curve for the current in the horizontal deflection coil.

19. A display comprising a cathode ray tube for displaying an image thereon; and a calculation circuit connected to said cathode ray tube for centering and dimensioning the image being displayed by
  (a) measuring durations of vertical border edges of the image and iteratively modifying adjustment values for a horizontal centering of the image to obtain equal lateral vertical edges,
  (b) measuring the durations of the vertical border edges of the image to calculate adjustment values for a horizontal dimension of the image to cause the vertical border edges to disappear, and
  (c) measuring durations of horizontal border edges of the image to calculate adjustment values of a vertical dimension of the image, and to calculate adjustment values of a vertical centering of the image to cause the horizontal border edges to disappear and to center the image vertically;

said calculation circuit indicates durations of the vertical border edges of the image by variables $T1_{HAV}$ and $T2_{HAV}$; and calculates the adjustment of the horizontal dimension of the image in step (b) is based upon the formula:

$$HSIZE = \frac{A_{Vopti}(T'/Td') - H_{AMPMIN}}{H_{AMPMAX} - H_{AMPMIN}} \times HSIZE_{MAX}$$

wherein:

$A_{vopti}$ is an optimum amplitude of a current in a horizontal deflection coil of the cathode ray tube to obtain an image of optimum width, with the amplitude being measured for a type of cathode ray tube, $HSIZE_{MAX}$ is a maximum value of the adjustment of the horizontal dimension of the image, $H_{AMPMAX}$ is a maximum variation of a current in the horizontal deflection coil to obtain a maximum horizontal deflection, this value varies as a function of a horizontal scanning frequency, $H_{AMPMIN}$ is a minimum variation of the current in the horizontal deflection coil to obtain a minimum horizontal deflection, this value varies as a function of the horizontal scanning frequency, T' is a total duration of a period T of a horizontal synchronization signal, from which are subtracted a duration of a flyback pulse $T_{FLYBACK}$ and a duration of safety margins, and Td'=T ($T1_{HAV}$+$T2_{HAV}$+$T_{FLYBACK}$), which is a duration of the image on the screen between the border edges.

20. A display according to claim 19, further comprising a display calculator connected to said cathode ray tube for providing display signals thereto, and wherein said display calculator comprises a memory for recording the adjustment values obtained.

21. A display according to claim 19, wherein said calculation circuit further checks for stability of the image by
- ($a_0$) measuring a pair of durations of at least one of the vertical and horizontal border edges of the image;
- ($a_1$) subtracting two successive measurements to determine a variation in the durations;
- ($a_2$) comparing the variation with a first threshold, and stopping if the first threshold is exceeded or continuing if the first threshold is not exceeded; and
- ($a_3$) comparing the measurements with a second threshold, and stopping if the second threshold is exceeded or continuing with at least one of steps (a) and (b) if the second threshold is not exceeded.

22. A display according to claim 21, wherein the durations of the vertical border edges of the image are indicated by variables $T1_{HAV}$ and $T2_{HAV}$; and wherein said calculation circuit further comprises performing:
- ($a_4$) checking that the measurements of the durations $T1_{HAV}$ and $T2_{HAV}$ are a first measurement since a start of steps (a), (b) or (c), and if a response of the checking is negative, then passing on to a sub-step ($a_6$), and if the response of the checking is positive, then passing on to a sub-step ($a_5$); and
- ($a_5$) comparing the measurements for $T1_{HAV}$ and $T2_{HAV}$.

23. A display according to claim 22, wherein step ($a_4$) further comprises:
setting a flag to a first logic value if $T1_{HAV} < T2_{HAV}$ to indicate that the image is to be displaced towards the right;
setting the flag to a second logic value if $T1_{HAV} < T2_{HAV}$ to indicate that the image is to be displaced towards the left; and
stopping the horizontal centering if $T1_{HAV} = T2_{HAV}$, since the image is centered horizontally, and passing on to step (b).

24. A display according to claim 23, wherein said calculation circuit further comprises performing:
- ($a_6$) checking whether the flag is at the second logic value, and if the checking is a positive response, then passing on to a next sub-step ($a_7$), and if the checking is a negative response, then passing on to a sub-step ($a_8$);
- ($a_7$) checking whether $T1_{HAV} < T2_{HAV}$, and if $T1_{HAV} = T2_{HAV}$, since the image is horizontally centered, then stopping, and if the checking is a positive response, then passing on to a sub-step ($a_9$), and if the checking is a negative response, then passing on to a sub-step ($a_{10}$); and
- ($a_8$) checking whether $T1_{HAV} < T2_{HAV}$, and if $T1_{HAV} = T2_{HAV}$ since the image is horizontally centered, then passing on to step (b), and if the checking is a positive response, then passing on to a sub-step ($a_{11}$), and if the checking is a negative response, then passing on to a sub-step ($a_{12}$).

25. A display according to claim 24, wherein said calculation circuit further comprises performing:
- ($a_9$) decrementing by one unit the adjustment value for centering the image to displace the image by one incremental step to the left, and passing on to a sub-step ($a_{13}$);
- ($a_{10}$) incrementing by one unit the adjustment value for centering the image to displace the image towards the right, since the image had been displaced by one incremental step too far towards the left, and stopping the horizontal centering since the image is centered horizontally and passing on to step (b);
- ($a_{11}$) incrementing by one unit the adjustment value for centering the image to displace the image by one incremental step to the right, and passing on to sub-step ($a_{13}$);

($a_{12}$) decrementing by one unit the adjustment value for centering the image to displace the image towards the left, since the image had been displaced by one incremental step too far towards the right, and stopping the horizontal centering since the image is centered horizontally and passing on to step (b);

($a_{13}$) incrementing a loop counter by one unit each time the substep ($a_9$) or ($a_{11}$) has been performed, then passing on to a following sub-step ($a_{14}$); and ($a_{14}$) checking whether content of the loop counter has attained a third threshold, and if the checking is a positive answer, then stopping on account of an impossibility of adjustment, and if the checking is a negative answer, then restarting the loop at step ($a_2$).

26. A display according to claim 19, wherein the coefficient T'/Td') in the formula is replaced by 1.8T'–Td'/2.8Td' to take into account a form of a curve for the current in the horizontal deflection coil.

UNITED STATES PATENT AND TRADEMARK OFFICE
CERTIFICATE OF CORRECTION

PATENT NO. : 7,215,378 B2
APPLICATION NO. : 10/344546
DATED : May 8, 2007
INVENTOR(S) : Janin et al.

It is certified that error appears in the above-identified patent and that said Letters Patent is hereby corrected as shown below:

In the Claims
Page 17 of 21 of the
Certificate of Correction,
Claim 10

Delete Claim 10
Insert corrected Claim 10:

-- A display according to Claim 1, wherein the durations of the horizontal border edges of the image are indicated by variables $T1_{VAV}$ and $T2_{VAV}$; and wherein calculating the adjustment of the vertical dimension of the image in step (c) is based upon the formula:

$$VSIZE' = 0.5[(3VSIZEMAX+2VSIZE)].[(Td \times T')/(Td' \times T)] - 1.5(VSIZEMAX);$$

and wherein calculating the adjustment of the vertical centering of the image in step (c) is based upon the formula:

Signed and Sealed this
Twenty-first Day of May, 2013

Teresa Stanek Rea
*Acting Director of the United States Patent and Trademark Office*

CERTIFICATE OF CORRECTION (continued)

U.S. Pat. No. 7,215,378 B2

Claim 10 continued $$VPOS' = VPOS + (A - B),$$

with $A = [(2.25+1.5 \cdot (VSIZE/VSIZEMAX)] \times [(0.5-T1/T) \cdot (VPOSMAX/0.6)]$, and $B = [(2.25+1.5 \cdot (VSIZE'/VSIZEMAX)] \times [0.5-T1/T') \cdot (VPOSMAX/0.6)]$, wherein:

Td is a duration of a reference image such that:

$Td = T2 - T1$ with $T1 = T1_{VAV}$ and $T2 = T - T2_{VAV}$,

T is a total duration of a vertical scanning sawtooth,

Td' is a duration of the image to dimension and to center such that:

$Td' = T2' - T1'$ with $T1' = T1'_{VAV}$ and $T2' = T' - T2'_{VAV}$,

VSIZE is an adjustment value for the vertical dimension of the reference image,

VSIZEMAX is a maximum adjustment value for the vertical dimension of the image,

VPOS is an adjustment for the vertical centering of the reference image, and

VPOSMAX is a maximum adjustment value for the vertical centering.

UNITED STATES PATENT AND TRADEMARK OFFICE
CERTIFICATE OF CORRECTION

PATENT NO. : 7,215,378 B2  
APPLICATION NO. : 10/344546  
DATED : May 8, 2007  
INVENTOR(S) : Janin et al.

Page 1 of 23

It is certified that error appears in the above-identified patent and that said Letters Patent is hereby corrected as shown below:

The Title Page, showing an illustrative figure, should be deleted and substitute therefor the attached title page.

Please replace all the drawings with new Figures 1-7 as attached.

Please replace the specification with the attached substituted specification.

This certificate supersedes the Certificates of Correction issued December 21, 2010 and May 21, 2013.

Signed and Sealed this  
Eleventh Day of June, 2013

Teresa Stanek Rea  
*Acting Director of the United States Patent and Trademark Office*

CERTIFICATE OF CORRECTION (continued)

(12) United States Patent
Janin et al.

(10) Patent No.: US 7,215,378 B2
(45) Date of Patent: May 8, 2007

(54) METHOD FOR CENTERING AND DIMENSIONING AN IMAGE ON A CATHODE-RAY TUBE

(75) Inventors: Pascal Janin, Tullins (FR); Laurent Vera, Edinburgh (GB); Hervé Pierrot, Saint Egreve (FR)

(73) Assignee: STMicroelectronics SA, Montrouge (FR)

( * ) Notice: Subject to any disclaimer, the term of this patent is extended or adjusted under 35 U.S.C. 154(b) by 679 days.

(21) Appl. No.: 10/344,546

(22) PCT Filed: Sep. 7, 2001

(86) PCT No.: PCT/FR01/02790

§ 371 (c)(1),
(2), (4) Date: Feb. 11, 2003

(87) PCT Pub. No.: WO02/21491

PCT Pub. Date: Mar. 14, 2002

(65) Prior Publication Data
US 2004/0012716 A1 Jan. 22, 2004

(30) Foreign Application Priority Data
Sep. 8, 2000 (FR) .................... 00 11482

(51) Int. Cl.
*H04N 9/74* (2006.01)
(52) U.S. Cl. .................. 348/511; 348/581; 348/704
(58) Field of Classification Search .......... 348/511, 348/745, 747, 580–581, 704, 806–807, 184–191, 348/181; 315/370–371; *H04N 5/04, 3/22, H04N 9/14*
See application file for complete search history.

(56) References Cited

U.S. PATENT DOCUMENTS

| | | | | |
|---|---|---|---|---|
| 5,654,743 A * | 8/1997 | Hu et al. | ............... | 345/213 |
| 5,713,040 A * | 1/1998 | Lee | ............... | 345/214 |
| 5,764,302 A | 6/1998 | Park | ............... | 348/542 |
| 5,801,767 A * | 9/1998 | Wu | ............... | 348/190 |
| 6,259,483 B1 * | 7/2001 | Jiang et al. | ............... | 348/511 |
| 6,259,484 B1 * | 7/2001 | Jiang et al. | ............... | 348/511 |
| 6,262,765 B1 * | 7/2001 | Jeong | ............... | 348/180 |

FOREIGN PATENT DOCUMENTS

| | | |
|---|---|---|
| DE | 19724409 | 12/1998 |
| DE | 19822311 | 4/1999 |

* cited by examiner

*Primary Examiner*—Trang U. Tran
(74) *Attorney, Agent, or Firm*—Lisa K. Jorgenson; Allen, Dyer, Doppelt, Milbrath & Gilchrist, P.A.

(57) ABSTRACT

A method for centering and dimensioning an image on a cathode ray tube receiving display signals supplied by a display calculator includes measuring durations of vertical black edges of the image, and modifying adjustment values for a horizontal centering of the image to obtain equal lateral vertical edges. The method further includes measuring the durations of the vertical black edges of the image to calculate adjustment values for a horizontal dimension of the image to cause the vertical black edges to disappear. Durations of the horizontal black edges of the image are measured to calculate adjustment values of a vertical dimension of the image, and to calculate adjustment values of a vertical centering of the image to cause the horizontal black edges to disappear for centering the image vertically. The adjustment values obtained are recorded in a memory of the display calculator.

26 Claims, 5 Drawing Sheets

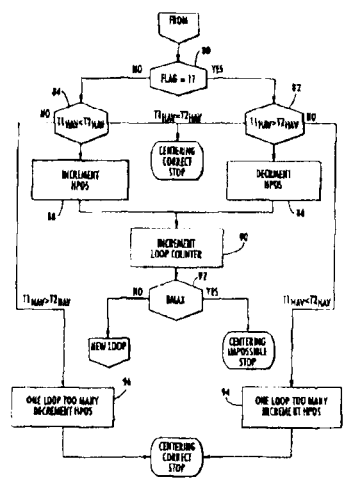

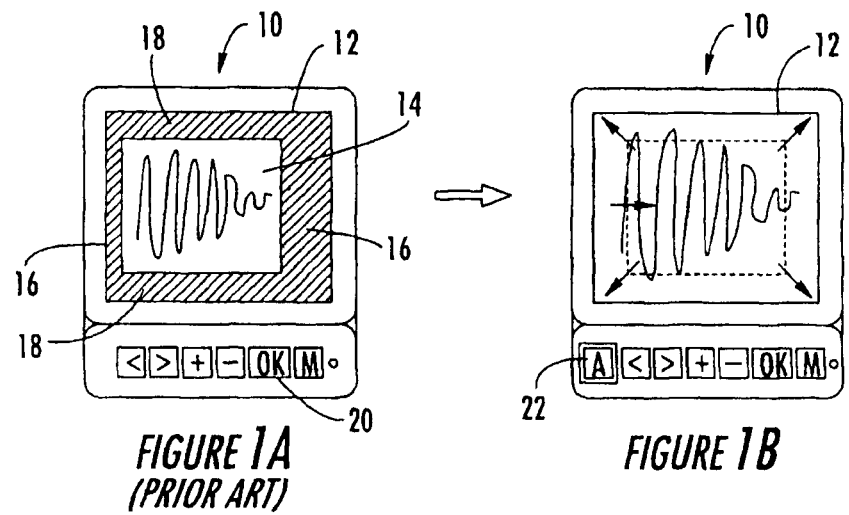
FIGURE 1A
(PRIOR ART)
FIGURE 1B
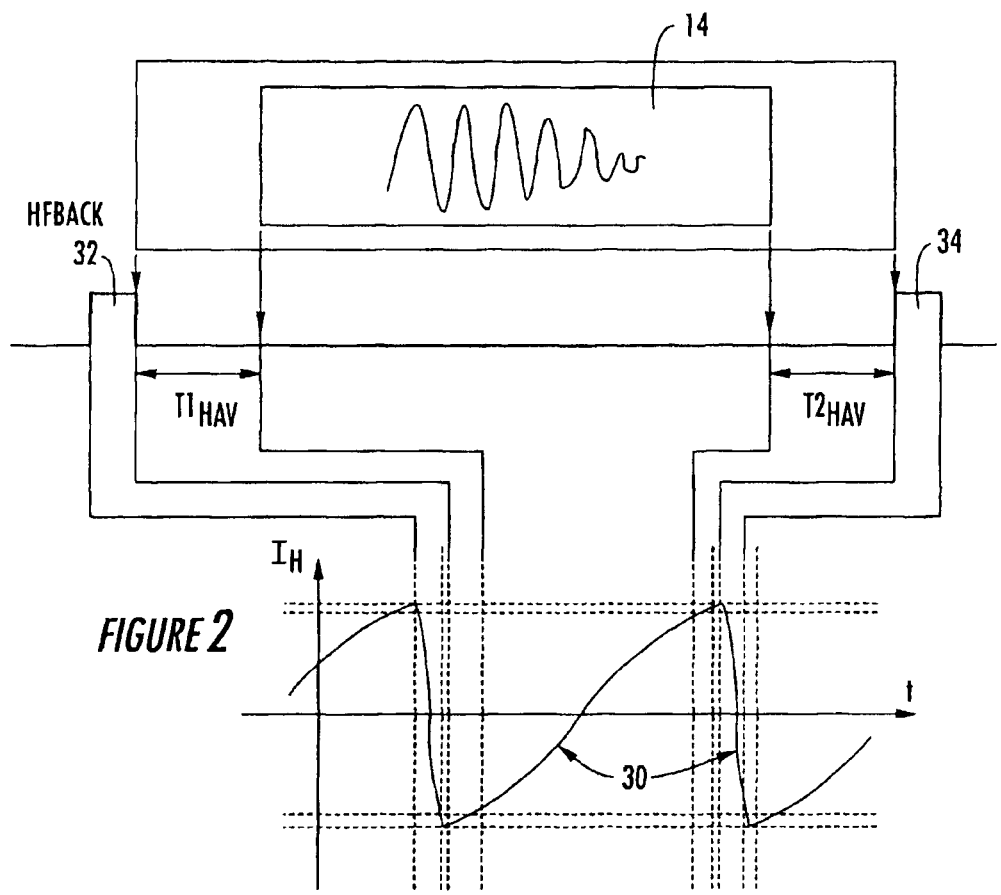
FIGURE 2

METHOD OF CENTERING AND DIMENSIONING AN IMAGE ON A CATHODE RAY TUBE

Field of the Invention

The present invention relates to cathode ray tubes for displaying images on television (TV) sets and personal computers (PC), and more particularly, to a method of automatically centering and dimensioning a displayed image.

Background of the Invention

A cathode ray tube for displaying images on a screen formed by its faceplate generally comprises electronic circuits which control the scanning of the screen by an electron beam so as to activate the luminescence of screen pixels, and thus produce the desired image.

These electronic scanning circuits are driven via a display controller through electrical signals which can have different sources, such as computer signals, signals from laser disks or game consoles. Because of their diversity, a same setting for the size and position of the image cannot be suitable for all sources. This can result in an undesirable centering of the image on the screen and in a distorted image. Moreover, these defects can exist for a cathode ray tube from the factory in the case where the settings are not properly adjusted. This can account for the presence of black stripes on the vertical or horizontal edges of the image, a horizontal or vertical shift of the image, or an image distortion in the horizontal or vertical direction.

Currently, these faults are corrected manually by the user through control buttons which bring up adjustment menus and sub-menus. Such an operating procedure is neither fast nor simple. This is notably due to the fact that there are only few control buttons which requires the user to employ a same button for several different functions. This is all the more inconvenient as these adjustments must be made as a function of the screen's operating mode, for example, to pass from one video mode to another, or from a traditional 640 x 480 pixel screen to a higher definition 1280 x 1024 pixel screen.

Accordingly, when changing from one video mode to another, the display calculator analyzes the new horizontal and vertical synchronization signals, calculates their frequencies and carries out the necessary adjustments to display a new image in the new mode. However, the image obtained is never perfectly adapted to the screen size, and consequently suffers from faults with regards to centering and dimensioning or to size as mentioned above.

Therefore, in the state of the art, the user must activate the control buttons provided for that purpose until the desired image is obtained, and the adjustments made are written into a memory of the display calculator, not only for the current session, but also for later sessions with the same display mode. However, despite this memory storage of the settings, the user often needs to readjust the latter during a subsequent use of the same display mode, and all the more so as the settings of the mode entered in memory are not always adapted to all software which use that mode.

Summary of the Invention

In view of the foregoing background, an object of the present invention is to implement a process for automatically centering and dimensioning an image on the screen of a cathode ray tube.

This and other objects, advantages and features are provided by a method for centering and dimensioning an image on a cathode ray tube whose display signals are supplied by a display calculator, wherein the method comprises the following steps:

(a) measuring the durations of the vertical black edges of the image and modifying step by step the adjustment for horizontal centering to obtain equal lateral vertical edges;

(b) measuring the durations of the vertical black edges of the image to calculate the adjustment of the horizontal dimension of the image so as to cause the vertical black edges to disappear;

(c) measuring the durations of the horizontal black edges of the image to calculate the adjustment of the vertical dimension of the image, and the adjustment of the vertical centering of the image so as to cause the horizontal black edges to disappear and to center
the image vertically; and (d) recording the adjustment values obtained in a memory of the display calculator.

Steps (a), (b) and (c) can be performed in any order because they are independent of each other, but it is preferable to perform step (a) before step (b), given that the precision for the calculation of the setting for the horizontal dimension of the image depends on the perfect horizontal centering of the image. Step (d) may be performed after each step (a), (b) or (c) to record the value of the setting obtained by the step having just been finished.

The method is implemented only if the image is sufficiently stable. Stability is detected by checking that the positions of the vertical and horizontal edges have fluctuations below a certain threshold. This stability may be checked before each step (a), (b) and (c).

Brief Description of the Drawings

Other characteristics and advantages of the present invention shall become apparent from reading the following description of a preferred embodiment, in relation with appended drawings in which:

FIG. 1A shows an image on a screen of a cathode ray tube which is not centered and exhibits a black border, and FIG. 1B shows the same image after implementation of the process in accordance with the present invention;

FIG. 2 is a diagram showing the relationship between the horizontal position of the image on a screen, and the horizontal scanning signal for an image line in accordance with the present invention;

FIG. 3 is a diagram analogous to that of FIG. 2, but showing the relationship between the vertical position of the image on the screen and the vertical scanning signal for a complete image in accordance with the present invention;

FIG. 4 is a diagram showing the main steps of the process in accordance with the present invention;

FIGS. 5A and 5B show the steps in the horizontal image centering algorithm in accordance with the process of the present invention, with this algorithm being preceded by an algorithm for checking the image stability;

FIG. 6 is a curve showing the variation of $H_{AMPMIN}$ as a function of the horizontal scanning frequency for a given range of frequencies in accordance with the present invention; and FIG. 7 is a diagram showing the adjustment for vertical centering and vertical dimensioning in accordance with the present invention.

Detailed Description of the Preferred Embodiments

FIG. 1A shows the faceplate 10 of a cathode ray tube 12, on the screen of which appears an image 14 whose vertical edges 16 and horizontal edges 18 are black (i.e., dark). The black edges indicate that the image 14 is not centered at the center of the screen, and that it only occupies a part of the screen.

As indicated in the introductory portion above, the adjustments for centering and dimensioning the image are at present made by the user through buttons 20 which bring down menus and sub-menus on the screen to guide the user in the adjustments. These control buttons 20 are active for the adjustments via a display calculator which supplies the values of horizontal and vertical scanning signals. This display calculator is capable of receiving the video signals and analyzing them to output these scanning signals.

In accordance with the invention, a control button 22 is added to implement the inventive process and obtain in a few seconds the correctly centered and dimensioned image of FIG. 1B. The process of the invention is based on the measurement of the length, in units of time, of vertical and horizontal black edges. These measurements then serve for carrying out algorithmic operations and calculations leading to a modification of the image centering and its dimensions.

FIG. 2 shows the image 14 and the corresponding horizontal scanning signal 30 as a function of time t for a line of the image, i.e., the current $I_H$ flowing in the horizontal deflection coil (yoke). The figure also shows the horizontal synchronization pulses 32 and 34 (HFBACK) which determine the start and end points of a horizontal scanning signal. The start of horizontal scanning corresponds to the falling edge of pulse 32, and the end corresponds to the rising edge of pulse 34. The duration of the scanning return (flyback) is given by the duration of pulse 32 or 34.

When the image exhibits vertical black edge portions, this comes from the fact that signals of the red, green and blue components at the start and end of horizontal scanning are all below a certain level. The measure of the time duration $T1_{HAV}$ between the falling edge and the start of the left of the image indicates the extent of the left vertical black edge portion, while a measure of $T2_{HAV}$ between the end of the right of the image and the rising edge indicates the extent of the right vertical black edge portion.

It then follows that if $T1_{HAV} = T2_{HAV}$, then the image is centered horizontally, whereas it is not centered if $T1_{HAV}$ is different from $T2_{HAV}$. The process in accordance with the invention obtains horizontal centering of the image by measuring $T1_{HAV}$ and $T2_{HAV}$ in a repetitive manner; comparing $T1_{HAV}$ and $T2_{HAV}$ at each time; displacing the image by one unit towards the right if $T1_{HAV} < T2_{HAV}$ and to the left if $T1_{HAV} > T2_{HAV}$ until $T1_{HAV} = T2_{HAV}$ is obtained.

The measurement of $T1_{HAV}$ and $T2_{HAV}$ is performed by the display calculator using a device provided to that effect, which is readily known by one skilled in the art. $T1_{HAV}$ and $T2_{HAV}$ do not allow obtaining of the horizontal dimensioning of the image for making the vertical black edge portions disappear, since the time interval between two horizontal synchronization pulses 32 and 34 is fixed, irrespective of the horizontal width of the image. The process of the invention produces this horizontal dimensioning by modifying the amplitude of the curve 30 in accordance with a formula, as shall be described below.

FIG. 3 shows the image 14 and the corresponding vertical scanning signal 40 as a function of time t for a complete image, i.e., the voltage $V_v$ of the vertical deflection sawtooth signal for line-by-line vertical screen scanning. The figure also shows the vertical synchronization signals 42 and 44 (VFBACK) which determine the start and end points of a vertical scanning signal. The duration of the pulse determines the duration of the return period for the vertical scanning signal.

As in the case of horizontal line scanning, the time periods $T1_{VAV}$ and $T2_{VAV}$ respectively define the extent of the top black edge portion and the bottom black edge portion of the image. However, these time periods cannot be used to center the image vertically because the time interval between the top and bottom edges of the image and the corresponding pulses 42 and 44 remain constant irrespective of the vertical position of the image.

Likewise, the time periods $T1_{VAV}$ and $T2_{VAV}$ cannot serve directly for vertically dimensioning the image because the time period of the vertical synchronization pulses 42, 44 remains the same irrespective of the image height. The measurement of $T1_{VAV}$ and $T2_{VAV}$ is carried out by the display calculator using the above-mentioned measuring device for measuring $T1_{HAV}$ and $T2_{HAV}$.

The process according to the invention provides the vertical centering and the vertical dimensioning by modifying the amplitude of the curve 40 in accordance with a formula as shall be described below. The diagram of FIG. 4 illustrates the main steps of the invention, which includes the following:

(a) measuring $T1_{HAV}$ and $T2_{HAV}$ to calculate the adjustment HPOS to perform in order to obtain the horizontal centering of the image (box 50);

(b) measuring $T1_{HAV}$ and $T2_{HAV}$ to calculate the adjustment to perform HSIZE in order to obtain the horizontal dimensioning of the image (box 52);

(c) measuring $T1_{VAV}$ and $T2_{VAV}$ to calculate the adjustment to perform VPOS and VSIZE in order to obtain at the same time vertical centering and the vertical dimensioning of the image (box 54); and (d) recording the values HPOS, HSIZE, VPOS' and VSIZE' in a memory (box 56) of the display calculator.

If an error arises during one of the steps 50, 52 and 54, notably in the case of image instability, the starting values are restored in the memory (box 58). These errors can arise from an image which is unstable, which is shifting, which is too small to be adjusted, or for any other reason.

Note that steps (a), (b) and (c) can be performed in any order, but it appears logical to start with the simplest, which is the horizontal centering step, due to the fact that it stems directly from the measurement of $T1_{HAV}$ and $T2_{HAV}$. Moreover, step (b) yields more precise results if it follows from step (a).

The diagrams of FIGS. 5A and 5B show in detail the operations to be performed during step (a) for horizontal centering. However, the first operations 60, 62, 64, 66, 68 and 70 are repeated, wholly or in part, at the start of each step (a), (b) or (c) to check that the image is stable within the established limits.

These first operations comprise the following steps: pressing on button 22 (arrow 60) to trigger the operations; performing a first series of measurements to obtain a first set of pairs of values $T1_{HAV1}$ and $T2_{HAV1}$, $T1_{VAV1}$ and $T2_{VAV1}$ (box 62); performing a second series of measurements to obtain a second set of pairs of values $T1_{HAV2}$ and $T2_{HAV2}$, $T1_{VAV2}$ and $T2_{VAV2}$ (box 64); subtracting the second set of pairs of values from the values from the first set (box 66) to obtain difference values DIFF in terms of absolute values; comparing the difference values DIFF with a threshold TMUDIFF (box 68); and stopping the operations if DIFF>TMUDIFF, for the image is then considered to be unstable or shifting, or passing onto the next operation (box 70) in the opposite case.

Note that the series of measurements $T1_{HAV}$ and $T2_{HAV}$ which concern the horizontal deflection are preferably only performed just before each horizontal adjustment (a) or (b) to determine the horizontal stability of the image. Likewise, the series of measurements $T1_{VAV}$ and $T2_{VAV}$, which concern the vertical deflection, are only performed just before the vertical adjustments, preferably for centering and dimensioning to determine the vertical image stability.

The first operation further includes comparing $T1_{HAV}$ and/or $T2_{HAV}$ (box 70) with a maximum value MAX and stopping the operations if it is reached, for the image is then considered to be too small and hence not exploitable, or that the video signal is bad (box 70). In the case of a negative comparison, the operation passes on to the next operation.

The first next operation concerns the horizontal centering, which comprises the following steps: checking whether the negative comparison arrives for the first time or not (box 72); and in the case of a positive check, passing on to the next operation comprising the steps of comparing $T1_{HAV}$ with $T2_{HAV}$ (box 74) and stopping the horizontal centering operations in the case of an inequality, for the image is already horizontally centered, and passing on to step (b); the image must be displaced to the right if $T1_{HAV} < T2_{HAV}$, with such an event being stored by a flag at the 0 state; the image must be displaced to the left if $T1_{HAV} > T2_{HAV}$, with such an event being stored by the flag, but in this case at the 1 state; and in the case of a negative check, or in the case where the image must be displaced, passing on to the next operation.

The value 0 or 1 for the flag indicates the direction in which the image is to be displaced. The displacement is in a stepwise manner by incrementing or decrementing the centering adjustment value HPOS. The following operations involve comparing $T1_{HAV}$ with $T2_{HAV}$ and modifying the centering adjustment value HPOS in the direction indicated by the value of the flag until detection of the equality $T1_{HAV} = T2_{HAV}$. These operations are presented in the diagram of FIG. 5B.

The first operation (box 80) includes checking whether the flag is at a logic 1, indicating that the image is off-centered in the right direction and must be brought back to the left. If the check is positive, the following operation includes checking whether $T1_{HAV} > T2_{HAV}$ (box 82), and there are three possible responses:

(i) $T1_{HAV} = T2_{HAV}$, in which case the image is centered and the horizontal centering operations are stopped to pass on to step (b);

(ii) $T1_{HAV} > T2_{HAV}$, in which case the image is off-centered in the right direction and must be displaced to the left by decrementing the adjustment value HPOS by one unit (box 86), and moreover, a loop counter 90 is incremented by one unit; and (iii) $T1_{HAV} < T2_{HAV}$, in which case the image which was off-centered in the right direction since the start of the operations is now off-centered towards the left, which means that the centering value HPOS has been exceeded by one unit. This overshoot is corrected by incrementing the horizontal adjustment value HPOS by one unit (box 94). With this incrementation, the value of HPOS corresponds to the center position, and the horizontal centering operations are stopped to pass on to step (b).

If the flag is not at a logic 1, i.e., the image is off-centered to the left and must be brought back to the right, the following operation (box 84) includes checking whether $T1_{HAV} < T2_{HAV}$, and there are three possible results as in the previous case:

(i) $T1_{HAV} = T2_{HAV}$, in which case the image is centered and the horizontal centering operations are stopped to pass on to step (b);

(ii) $T1_{HAV} < T2_{HAV}$, in which case the image is off-centered in the left direction and must be displaced to the right by incrementing the adjustment value HPOS by one unit (box 88), and moreover, a loop counter 90 is incremented by one unit; and (iii) $T1_{HAV} > T2_{HAV}$, in which case the image which was off-centered in the left direction since the start of the operations is now off-centered towards the right, which means that the centering value HPOS has been exceeded by one unit. This overshoot is corrected by decrementing the horizontal adjustment value HPOS by one unit (box 96). With this incrementation, the value of HPOS corresponds to the center position and the horizontal centering operations are stopped to pass on to step (b).

If the loop counter 90 is incremented, this means that the centering value HPOS has not yet been obtained and that it is necessary to start again all the operations described above (new loop) starting from step 62 that includes measuring new values of $T1_{HAV}$ and $T2_{HAV}$ subsequent to the new value of HPOS.

However, this new loop is performed only if the number of loops has not exceeded a certain threshold BMAX. The operation includes comparing (box 92) the contents of the loop counter 90 with BMAX, stopping the operations if the centering has not been achieved after a set number of shifts BMAX, or starting a new loop if BMAX is not attained.

To set the horizontal dimension of the image such that it takes up the entire width of the screen, i.e., without vertical black edges, it is necessary to change the amplitude setting for the current flowing in the horizontal deflection coil. Such an adjustment is represented by a value HSIZE which can vary, e.g., between 0 and 255. It is this value HSIZE for obtaining a maximum image width which is calculated by the method according to the invention. This value is dependent on many parameters, and notably $T1_{HAV}$ and $T2_{HAV}$. The formula which enables calculation of HSIZE is:

$$HSIZE = \frac{A_{Vopti}(T'/Td') - H_{AMPMIN}}{H_{AMPMAX} - H_{AMPMIN}} \times HSIZE_{MAX}$$

The variables in the formula are defined as follows:
- $A_{Vopti}$ is the optimum amplitude of the current in the horizontal deflection coil to obtain an image of optimum width. This amplitude is measured for a type of cathode ray tube and in a reference video mode;
- $HSIZE_{MAX}$ is the maximum value of HSIZE, e.g., 255 as indicated above,
- $H_{AMPMAX}$ is the maximum variation of the current in the horizontal deflection coil to obtain a maximum horizontal deflection. This value varies as a function of the horizontal scanning frequency f(fH) as described below;
- $H_{AMPMIN}$ is the minimum variation of the current in the horizontal deflection coil to obtain a minimum horizontal deflection. This value varies as a function of the horizontal scanning frequency f (fH) as described below;
- T' is the total duration of a horizontal line, i.e., the duration of the period T of the horizontal synchronization signal, from which are subtracted the duration of the flyback pulse $T_{FLYBACK}$, in general three microseconds, and a duration of safety margins of 0.6 microseconds, for example; and $$- Td' = T - (T1_{HAV} + T2_{HAV} + T_{FLYBACK}),$$

that is, the duration of the image on the screen between these black edges.

This formula is established by supposing that the current varies linearly, which is not the case. To take into account the fact that the curve is S shaped, the coefficient applied $A_{Vopti}$ must be replaced by $$(1.8T' - Td')/2.8Td'.$$

This coefficient can change depending on the type of cathode ray tube and its control device.

The values for $H_{AMPMIN}$ and $H_{AMPMAX}$ are determined using curves as a function of the horizontal scanning frequency f(H), this being effected for frequency ranges. For instance, curve 100 of FIG. 6 shows the function of $H_{AMPMIN}$ = f(fH) for a range of frequencies from 34kHz to 41kHz for the case of a given cathode ray tube. The abscissa x is graduated in kHz while the ordinate is graduated in $H_{AMP}$ x 10mA. There is thus obtained a straight line whose equation is:

$$Y = -5.22x + 1265.1 = ax + b$$

This equation is different for another range of frequencies. Coefficients a and b determined for each range of frequencies are recorded in a memory so that they can be read in view of calculating $H_{AMPMIN}$ according to the horizontal scanning frequency.

$H_{AMPMAX}$ is obtained in the same manner as for $H_{AMPMIN}$. As a result, if there are eight frequency ranges, there shall be sixteen pairs of coefficients (a, b) which define the sixteen variation curves, eight for $H_{AMPMIN}$ and eight for $H_{AMPMAX}$.

To achieve vertical centering and vertical dimensioning, the method according to the invention includes measuring the values $T1_{VAV}$ and $T2_{VAV}$ for the image which appears on the screen, and then first calculating VSIZE to obtain the vertical dimensioning and subsequently VPOS' to obtain the vertical centering according to the following formula:

$$\text{VSIZE}' = 0.5[(3\text{VSIZEMAX}+2\text{VSIZE})].[(\text{Td} \times \text{T}')/(\text{Td}' \times \text{T})]-1.5(\text{VSIZEMAX}), \text{ and}$$

$$\text{VPOS}' = \text{VPOS} + (\text{A} - \text{B}) \text{ with } \text{A} = [(2.25+1.5.(\text{VSIZE}/\text{VSIZEMAX})] \times [(0.5-\text{T1}/\text{T}).(\text{VPOSMAX}/0.6)], \text{ and}$$

$$\text{B} = [(2.25+1.5.(\text{VSIZE}'/\text{VSIZEMAX})] \times [0.5-\text{T1}'/\text{T}').(\text{VPOSMAX}/0.6)]$$

To define the parameters of these formulas, reference shall be made to FIG. 7, which shows the sawtooth for vertical scanning 40, but inversed with respect to that of FIG. 3. The abscissa shows the duration and the ordinate shows the voltage $V_{OUT}$. On this sawtooth is placed the image 112 to be vertically centered and dimensioned and a reference image which is appropriately vertically centered and dimensioned.

In FIG. 7, $T_1$ and $T_2$ correspond in time periods respectively to the start and end of the reference image 114, while T1' and T2' correspond in time periods respectively to the start and end of the image 112 to be centered and dimensioned. The following relations are then established. The duration Td of the reference image is given by Td = T2-T1, and the duration Td' of the image to be centered is given by Td' = T2'-T1'. Also, T1 = T1$_{VAV}$ and T2 = T - T2$_{VAV}$, with T being the total duration of a sawtooth. Similarly, T1' = T1'$_{VAV}$ and T2' = T' - T2'$_{VAV}$.

The reference image 114 is obtained by a manual adjustment in a reference video mode on a given type of cathode ray tube, and the values T1$_{VAV}$ and T2$_{VAV}$ are measured and entered into a memory to be used for the automatic adjustments on that type of cathode ray tube. The same applies for the value VSIZE, which corresponds to that reference image, while VZIZEMAX is the maximum adjustment value, for example, 256.

These elements allow calculation of the value VSIZE' according to the above formula, i.e., the adjustment value that will allow one to obtain an image which is appropriately vertically dimensioned. By knowing VSIZE', it is possible to calculate VPOS' according to the above formula, which also uses the value VPOSMAX, which is the maximum adjustment for the vertical centering.

The invention has been described in its application to the adjustment of a cathode ray tube by the user of a computer or a television set in which the cathode ray tube forms the display screen. The invention also applies to the implementation of the process for adjusting the horizontal and vertical deflection coils at the end of a cathode ray tube production line.

Indeed, at the end of a cathode ray tube production line, the image generated to test for the correct operation of the cathode ray tube exhibits faults which an operator corrects in various ways. One of the faults concerns a bad alignment between the image and screen centers and, to correct it, the operator first performs image centering and dimensioning adjustments using the buttons 20 (FIG. 1A). This is done to make adjustments in the electronic and magnetic circuits (deflection coils) to displace the image center and make it coincide with the center of the screen. In this sequence of operations, the method of the invention can be implemented to obtain the centering HPOS and HPOS', and possibly the dimensioning HSIZE and VSIZE'.

For this adjustment, the operations to be performed would then be as follows: display a calibrated image such as, for example, a white image with a perfectly centered cross; launch the process of the invention wholly or in part; and modify the electronic and magnetic settings for the screen to bring the cross to the center of the screen.

The claims should read as follows:

The invention claimed is:

1. A display comprising
a cathode ray tube for displaying an image thereon; and
a calculation circuit connected to said cathode ray tube for centering and dimensioning the image being displayed by
- (a) measuring durations of vertical border edges of the image and iteratively modifying adjustment values for a horizontal centering of the image to obtain equal lateral vertical edges,
- (b) measuring the durations of the vertical border edges of the image to calculate adjustment values for a horizontal dimension of the image to cause the vertical border edges to disappear, and
- (c) measuring durations of horizontal border edges of the image to calculate adjustment values of a vertical dimension of the image, and to calculate adjustment values of a vertical centering of the image to cause the horizontal border edges to disappear and to center the image vertically;

said calculation circuit further checking stability of the image at a start of at least one of the steps (a), (b) and (c), by
- ($a_0$) measuring a pair of durations of at least one of the vertical and horizontal border edges of the image,
- ($a_1$) subtracting two successive measurements to determine a variation in the durations,
- ($a_2$) comparing the variation with a first threshold, and stopping if the first threshold is exceeded or continuing if the first threshold is not exceeded, and
- ($a_3$) comparing the measurements with a second threshold, and stopping if the second threshold is exceeded or continuing with at least one of steps (a), (b) and (c) if the second threshold is not exceeded.

2. A display according to claim 1, further comprising a display calculator connected to said cathode ray tube for providing display signals thereto.

3. A display according to claim 2, wherein said display calculator comprises a memory for recording the adjustment values obtained.

4. A display according to claim 1, wherein the durations of the vertical border edges of the image are indicated by variables $T1_{HAV}$ and $T2_{HAV}$; and wherein said calculation circuit further comprises performing:
- ($a_4$) checking that the measurements of the durations $T1_{HAV}$ and $T2_{HAV}$ are a first measurement since a start of steps (a), (b) or (C), and if a response of the checking is negative, then passing on to a sub-step ($a_0$), and if the response of the checking is positive, then passing on to a substep ($a_5$); and
- ($a_5$) comparing the measurements for $T1_{HAV}$ and $T2_{HAV}$.

5. A display according to claim 4, wherein step ($a_4$) further comprises:
setting a flag to a first logic value if $T1_{HAV} < T2_{HAV}$ to indicate that the image is to be displaced towards the right;
setting the flag to a second logic value if $T1_{HAV} < T2_{HAV}$ to indicate that the image is to be displaced towards the left; and
stopping the horizontal centering if $T1_{HAV} = T2_{HAV}$, since the image is centered horizontally, and passing on to step (b).

6. A display according to claim 5, wherein said calculation circuit further comprises performing:
- ($a_6$) checking whether the flag is at the second logic value, and if the checking is a positive response, then passing on to a next sub-step ($a_7$), and if the checking is a negative response, then passing on to a sub-step ($a_8$);

($a_7$) checking whether $T1_{HAV} < T2_{HAV}$, and if $T1_{HAV}=T2_{HAV}$ since the image is horizontally centered, then stopping, and if the checking is a positive response, then passing on to a sub-step ($a_9$), and if the checking is a negative response, then passing on to a sub-step ($a_{10}$); and ($a_8$) checking whether $T1_{HAV} < T2_{HAV}$, and if $T1_{HAV}=T2_{HAV}$ since the image is horizontally centered, then passing on to step (b), and if the checking is a positive response, then passing on to a sub-step ($a_{11}$), and if the checking is a negative response, then passing on to a sub-step ($a_{12}$).

7. A display according to claim 6, wherein said calculation circuit further comprises performing:

($a_9$) decrementing by one unit the adjustment value for centering the image to displace the image by one incremental step to the left, and passing on to a sub-step ($a_{13}$);

($a_{10}$) incrementing by one unit the adjustment value for centering the image to displace the image towards the right, since the image had been displaced by one incremental step too far towards the left, and stopping the horizontal centering since the image is centered horizontally and passing on to step (b);

($a_{11}$) incrementing by one unit the adjustment value for centering the image to displace the image by one incremental step to the right, and passing on to sub-step ($a_{13}$);

($a_{12}$) decrementing by one unit the adjustment value for centering the image to displace the image towards the left, since the image had been displaced by one incremental step too far towards the right, and stopping the horizontal centering since the image is centered horizontally and passing on to step (b);

($a_{13}$) incrementing a loop counter by one unit each time the sub-step ($a_9$) or ($a_{11}$) has been performed, then passing on to a following sub-step ($a_{14}$); and ($a_{14}$) checking whether content of the loop counter has attained a third threshold, and if the checking is a positive answer, then stopping on account of an impossibility of adjustment, and if the checking is a negative answer, then restarting the loop at step ($a_2$).

8. A display according to claim 1, wherein the durations of the vertical border edges of the image are indicated by variables $T1_{HAV}$ and $T2_{HAV}$; and wherein calculating the adjustment of the horizontal dimension of the image in step (b) is based upon the formula:

$$HSIZE = \frac{A_{Vopti}(T'/Td') - H_{AMPMIN}}{H_{AMPMAX} - H_{AMPMIN}} \times HSIZE_{MAX}$$

wherein:

$A_{Vopti}$ is an optimum amplitude of a current in a horizontal deflection coil of the cathode ray tube to obtain an image of optimum width, with the amplitude being measured for a type of cathode ray tube, $HSIZE_{MAX}$ is a maximum value of the adjustment of the horizontal dimension of the image, $H_{AMPMAX}$ is a maximum variation of a current in the horizontal deflection coil to obtain a maximum horizontal deflection, this value varies as a function of a horizontal scanning frequency;

$H_{AMPMIN}$ is a minimum variation of the current in the horizontal deflection coil to obtain a minimum horizontal deflection, this value varies as a function of the horizontal scanning frequency;

T' is a total duration of a period T of a horizontal synchronization signal, from which are subtracted a duration of a flyback pulse TFLYBACK and a duration of safety margins, and $Td'=T-(T1_{HAV}+T2_{HAV}+T_{FLYBACK})$, which is a duration of the image on the screen between the border edges.

9. A display according to claim 8, wherein the coefficient (T'/Td') in the formula is replaced by 1.8T'−Td'/2.8Td' to take into account a form of a curve for the current in the horizontal deflection coil.

10. A display according to Claim 1, wherein the durations of the horizontal border edges of the image are indicated by variables $T1_{VAV}$ and $T2_{VAV}$; and wherein calculating the adjustment of the vertical dimension of the image in step (c) is based upon the formula:

$$VSIZE' = 0.5[(3VSIZEMAX+2VSIZE)] \cdot [(Td \times T')/(Td' \times T)] - 1.5(VSIZEMAX);$$

and wherein calculating the adjustment of the vertical centering of the image in step (c) is based upon the formula:

Claim 10 continued $$VPOS' = VPOS + (A - B),$$

with $A = [(2.25+1.5 \cdot (VSIZE/VSIZEMAX)] \times [(0.5-T1/T) \cdot (VPOSMAX/0.6)]$, and $B = [(2.25+1.5 \cdot (VSIZE'/VSIZEMAX)] \times [0.5-T1/T') \cdot (VPOSMAX/0.6)]$, wherein:

Td is a duration of a reference image such that:

$Td = T2 - T1$ with $T1 = T1_{VAV}$ and $T2 = T - T2_{VAV}$,

T is a total duration of a vertical scanning sawtooth,

Td' is a duration of the image to dimension and to center such that:

$Td' = T2' - T1'$ with $T1' = T1'_{VAV}$ and $T2' = T' - T2'_{VAV}$,

VSIZE is an adjustment value for the vertical dimension of the reference image,

VSIZEMAX is a maximum adjustment value for the vertical dimension of the image,

VPOS is an adjustment for the vertical centering of the reference image, and

VPOSMAX is a maximum adjustment value for the vertical centering.

11. A display comprising
a cathode ray tube for displaying an image thereon; and
a calculation circuit connected to said cathode ray tube for horizontal centering and horizontal dimensioning the image being displayed on said screen by
- (a) measuring durations of vertical border edges of the image and iteratively modifying adjustment values for a horizontal centering of the image to obtain equal lateral vertical edges, and
- (b) measuring the durations of the vertical border edges of the image to calculate adjustment values for a horizontal dimension of the image to cause the vertical border edges to disappear said calculation circuit further checking for stability of the image by
- ($a_0$) measuring a pair of durations of at least one of the vertical and horizontal border edges of the image,
- ($a_1$) subtracting two successive measurements to determine a variation in the durations,
- ($a_2$) comparing the variation with a first threshold, and stopping if the first threshold is exceeded or continuing if the first threshold is not exceeded, and
- ($a_3$) comparing the measurements with a second threshold, and stopping if the second threshold is exceeded or continuing with at least one of steps (a) and (b) if the second threshold is not exceeded.

12. A display according to claim 11, further comprising a display calculator connected to said cathode ray tube for providing display signals thereto.

13. A display according to claim 11, wherein the durations of the vertical border edges of the image are indicated by variables $T1_{HAV}$ and $T2_{HAV}$; and wherein said calculation circuit further comprises performing:
- ($a_4$) checking that the measurements of the durations $T1_{HAV}$ and $T2_{HAV}$ are a first measurement since a start of steps (a) or (b), and if a response of the checking is negative, then passing on to a sub-step ($a_6$), and if the response of the checking is positive, then passing on to a sub-step ($a_5$); and
- ($a_5$) comparing the measurements for $T1_{HAV}$ and $T2_{HAV}$.

14. A display according to claim 13, wherein step ($a_4$) further comprises:
setting a flag to a first logic value if $T1_{HAV} < T2_{HAV}$ to indicate that the image is to be displaced towards the right;
setting the flag to a second logic value if $T1_{HAV} < T2_{HAV}$ to indicate that the image is to be displaced towards the left; and
stopping the horizontal centering if $T1_{HAV} = T2_{HAV}$, since the image is centered horizontally, and passing on to step (b).

15. A display according to claim 14, wherein said calculation circuit further comprises performing:
- ($a_6$) checking whether the flag is at the second logic value, and if the checking is a positive response, then passing on to a next sub-step ($a_7$), and if the checking is a negative response, then passing on to a substep ($a_8$);
- ($a_7$) checking whether $T1_{HAV} < T2_{HAV}$, and if $T1_{HAV} = T2_{HAV}$ since the image is horizontally centered, then stopping, and if the checking is a positive response, then passing on to a sub-step ($a_9$), and if the checking is a negative response, then passing on to a sub-step ($a_{10}$); and
- ($a_8$) checking whether $T1_{HAV} < T2_{HAV}$, and if $T1_{HAV} = T2_{HAV}$, since the image is horizontally centered, then passing on to step (b), and if the checking is a positive response, then passing on to a sub-step ($a_{11}$), and if the checking is a negative response, then passing on to a sub-step ($a_{12}$).

16. A display according to claim 15, wherein said calculation circuit further comprises performing:
- ($a_9$) decrementing by one unit the adjustment value for centering the image to displace the image by one incremental step to the left, and passing on to a sub-step ($a_{13}$);
- ($a_{10}$) incrementing by one unit the adjustment value for centering the image to displace the image towards the right, since the image had been displaced by one incremental step too far towards the left, and stopping the horizontal centering since the image is centered horizontally and passing on to step (b);
- ($a_{11}$) incrementing by one unit the adjustment value for centering the image to displace the image by one incremental step to the right, and passing on to sub-step ($a_{13}$);
- ($a_{12}$) decrementing by one unit the adjustment value for centering the image to displace the image towards the left, since the image had been displaced by one incremental step too far towards the right, and stopping the horizontal centering since the image is centered horizontally and passing on to step Cb);
- ($a_{13}$) incrementing a loop counter by one unit each time the sub-step ($a_9$) or ($a_{11}$) has been performed, then passing on to a following sub-step ($a_{14}$); and
- ($a_{14}$) checking whether content of the loop counter has attained a third threshold, and if the checking is a positive answer, then stopping on account of an impossibility of adjustment, and if the checking is a negative answer, then restarting the loop at step ($a_2$).

17. A display according to claim 11, wherein the durations of the vertical border edges of the image are indicated by variables $T1_{HAV}$ and $T2_{HAV}$; and wherein calculating the adjustment of the horizontal dimension of the image in step (b) is based upon the formula:

$$HSIZE = \frac{A_{Vopn}(T'/Td') - H_{AMPMIN}}{H_{AMPMAX} - H_{AMPMIN}} \times HSIZE_{MAX}$$

wherein:
- $A_{vopti}$ is an optimum amplitude of a current in a horizontal deflection coil of the cathode ray tube to obtain an image of optimum width, with the amplitude being measured for a type of cathode ray tube,
- $HSIZE_{MAX}$ is a maximum value of the adjustment of the horizontal dimension of the image,
- $H_{AMPMAX}$ is a maximum variation of a current in the horizontal deflection coil to obtain a maximum horizontal deflection, this value varies as a function of a horizontal scanning frequency;
- $H_{AMPMIN}$ is a minimum variation of the current in the horizontal deflection coil to obtain a minimum horizontal deflection, this value varies as a function of the horizontal scanning frequency;
- T' is a total duration of a period T of a horizontal synchronization signal, from which are subtracted a duration of a flyback pulse $T_{FLYBACK}$ and a duration of safety margins, and
- $Td'=T-(T1_{HAV}+T2_{HAV}+T_{FLYBACK})$, which is a duration of the image on the screen between the border edges.

18. A display according to claim 17, wherein the coefficient (T'/Td') in the formula is replaced by 1.8T'−Td'/2.8Td' to take into account a form of a curve for the current in the horizontal deflection coil.

19. A display comprising
a cathode ray tube for displaying an image thereon; and
a calculation circuit connected to said cathode ray tube for centering and dimensioning the image being displayed by
  (a) measuring durations of vertical border edges of the image and iteratively modifying adjustment values for a horizontal centering of the image to obtain equal lateral vertical edges,
  (b) measuring the durations of the vertical border edges of the image to calculate adjustment values for a horizontal dimension of the image to cause the vertical border edges to disappear, and
  (c) measuring durations of horizontal border edges of the image to calculate adjustment values of a vertical dimension of the image, and to calculate adjustment values of a vertical centering of the image to cause the horizontal border edges to disappear and to center the image vertically;
said calculation circuit indicates durations of the vertical border edges of the image by variables $T1_{HAV}$ and $T2_{HAV}$; and calculates the adjustment of the horizontal dimension of the image in step (b) is based upon the formula:

$$HSIZE = \frac{A_{vopti}(T'/Td') - H_{AMPMIN}}{H_{AMPMAX} - H_{AMPMIN}} \times HSIZE_{MAX}$$

wherein:
- $A_{vopti}$ is an optimum amplitude of a current in a horizontal deflection coil of the cathode ray tube to obtain an image of optimum width, with the amplitude being measured for a type of cathode ray tube,
- $HSIZE_{MAX}$ is a maximum value of the adjustment of the horizontal dimension of the image,
- $H_{AMPMAX}$ is a maximum variation of a current in the horizontal deflection coil to obtain a maximum horizontal deflection, this value varies as a function of a horizontal scanning frequency,
- $H_{AMPMIN}$ is a minimum variation of the current in the horizontal deflection coil to obtain a minimum horizontal deflection, this value varies as a function of the horizontal scanning frequency,
- T' is a total duration of a period T of a horizontal synchronization signal, from which are subtracted a duration of a flyback pulse $T_{FLYBACK}$ and a duration of safety margins, and
- $Td'=T-(T1_{HAV}+T2_{HAV}+T_{FLYBACK})$, which is a duration of the image on the screen between the border edges.

20. A display according to claim 19, further comprising a display calculator connected to said cathode ray tube for providing display signals thereto, and wherein said display calculator comprises a memory for recording the adjustment values obtained.

21. A display according to claim 19, wherein said calculation circuit further checks for stability of the image by
- ($a_0$) measuring a pair of durations of at least one of the vertical and horizontal border edges of the image;
- ($a_1$) subtracting two successive measurements to determine a variation in the durations;
- ($a_2$) comparing the variation with a first threshold, and stopping if the first threshold is exceeded or continuing if the first threshold is not exceeded; and
- ($a_3$) comparing the measurements with a second threshold, and stopping if the second threshold is exceeded or continuing with at least one of steps (a) and (b) if the second threshold is not exceeded.

22. A display according to claim 21, wherein the durations of the vertical border edges of the image are indicated by variables $T1_{HAV}$ and $T2_{HAV}$; and wherein said calculation circuit further comprises performing:
- ($a_4$) checking that the measurements of the durations $T1_{HAV}$ and $T2_{HAV}$ are a first measurement since a start of steps (a), (b) or (c), and if a response of the checking is negative, then passing on to a sub-step ($a_6$), and if the response of the checking is positive, then passing on to a sub-step ($a_5$); and
- ($a_5$) comparing the measurements for $T1_{HAV}$ and $T2_{HAV}$.

23. A display according to claim 22, wherein step ($a_4$) further comprises:
setting a flag to a first logic value if $T1_{HAV} < T2_{HAV}$ to indicate that the image is to be displaced towards the right;
setting the flag to a second logic value if $T1_{HAV} < T2_{HAV}$ to indicate that the image is to be displaced towards the left; and
stopping the horizontal centering if $T1_{HAV} = T2_{HAV}$, since the image is centered horizontally, and passing on to step (b).

24. A display according to claim 23, wherein said calculation circuit further comprises performing:
- ($a_6$) checking whether the flag is at the second logic value, and if the checking is a positive response, then passing on to a next sub-step ($a_7$), and if the checking is a negative response, then passing on to a sub-step ($a_8$);
- ($a_7$) checking whether $T1_{HAV} < T2_{HAV}$, and if $T1_{HAV} = T2_{HAV}$, since the image is horizontally centered, then stopping, and if the checking is a positive response, then passing on to a sub-step ($a_9$), and if the checking is a negative response, then passing on to a sub-step ($a_{10}$); and
- ($a_8$) checking whether $T1_{HAV} < T2_{HAV}$, and if $T1_{HAV} = T2_{HAV}$ since the image is horizontally centered, then passing on to step (b), and if the checking is a positive response, then passing on to a sub-step ($a_{11}$), and if the checking is a negative response, then passing on to a sub-step ($a_{12}$).

25. A display according to claim 24, wherein said calculation circuit further comprises performing:
- ($a_9$) decrementing by one unit the adjustment value for centering the image to displace the image by one incremental step to the left, and passing on to a sub-step ($a_{13}$);
- ($a_{10}$) incrementing by one unit the adjustment value for centering the image to displace the image towards the right, since the image had been displaced by one incremental step too far towards the left, and stopping the horizontal centering since the image is centered horizontally and passing on to step (b);
- ($a_{11}$) incrementing by one unit the adjustment value for centering the image to displace the image by one incremental step to the right, and passing on to sub-step ($a_{13}$);

($a_{12}$) decrementing by one unit the adjustment value for centering the image to displace the image towards the left, since the image had been displaced by one incremental step too far towards the right, and stopping the horizontal centering since the image is centered horizontally and passing on to step (b);

($a_{13}$) incrementing a loop counter by one unit each time the substep ($a_9$) or ($a_{11}$) has been performed, then passing on to a following sub-step ($a_{14}$); and ($a_{14}$) checking whether content of the loop counter has attained a third threshold, and if the checking is a positive answer, then stopping on account of an impossibility of adjustment, and if the checking is a negative answer, then restarting the loop at step ($a_2$).

26. A display according to claim 19, wherein the coefficient T'/Td') in the formula is replaced by 1.8T'−Td'/2.8Td' to take into account a form of a curve for the current in the horizontal deflection coil.